US012755096B2

(12) United States Patent
Beemanapalli et al.

(10) Patent No.: US 12,755,096 B2
(45) Date of Patent: Oct. 6, 2026

(54) SYSTEM AND METHOD FOR PROVIDING A NATURAL LANGUAGE GENERATOR SERVICE FOR USE WITH DATA ANALYTICS ENVIRONMENTS

(71) Applicant: ORACLE INTERNATIONAL CORPORATION, Redwood Shores, CA (US)

(72) Inventors: Kalyan Beemanapalli, Eden Prairie, MN (US); Ramesh Vasudevan, Los Altos, CA (US); Nikhil Surve, San Ramon, CA (US); Kenneth Eng, Fremont, CA (US)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 0 days.

(21) Appl. No.: 18/886,723

(22) Filed: Sep. 16, 2024

(65) Prior Publication Data

US 2025/0094440 A1 Mar. 20, 2025

Related U.S. Application Data

(60) Provisional application No. 63/538,673, filed on Sep. 15, 2023.

(51) Int. Cl.
*G06F 40/279* (2020.01)
*G06F 9/451* (2018.01)
(Continued)

(52) U.S. Cl.
CPC ............ *G06F 40/279* (2020.01); *G06F 9/453* (2018.02); *G06F 16/258* (2019.01); *G06F 16/26* (2019.01);
(Continued)

(58) Field of Classification Search
CPC ............................... G06F 16/26; G06F 16/258
See application file for complete search history.

(56) References Cited

U.S. PATENT DOCUMENTS 11,829,378 B1 11/2023 Sreekanta
11,836,172 B2 12/2023 Du
(Continued)

FOREIGN PATENT DOCUMENTS

| | | |
|---|---|---|
| KR | 20200069806 | 6/2020 |
| WO | 2023049140 | 3/2023 |

OTHER PUBLICATIONS

European Patent Office, International Search Authority, Notification of Transmittal of The International Search Report and The Written Opinion of the International Searching Authority, or the Declaration dated Dec. 19, 2024 for International Application No. PCT/US2024/046802 , 13 pages.
(Continued)

*Primary Examiner* — Khanh B Pham
(74) *Attorney, Agent, or Firm* — TUCKER ELLIS LLP

(57) ABSTRACT

System and method for providing a natural language generator service for use with data analytics environments. A data analytics system or environment can be integrated with a digital assistant system or environment which provides natural language processing, for purposes of leveraging a user's text or speech input, within a data analytics or data visualization project, for example while generating, modifying, or interacting with data visualizations.

20 Claims, 18 Drawing Sheets

(51) Int. Cl.

| | |
|---|---|
| ***G06F 16/25*** | (2019.01) |
| ***G06F 16/26*** | (2019.01) |
| ***G06F 40/30*** | (2020.01) |
| ***G06F 40/40*** | (2020.01) |
| ***G06T 11/20*** | (2006.01) |

(52) U.S. Cl.

CPC .............. *G06F 40/30* (2020.01); *G06F 40/40* (2020.01); *G06T 11/206* (2013.01); *G06T 2200/24* (2013.01)

(56) References Cited

U.S. PATENT DOCUMENTS

| | | | | |
|---|---|---|---|---|
| 12,182,493 | B2 | 12/2024 | Rony | |
| 12,265,557 | B2 | 4/2025 | George | |
| 12,373,498 | B2 | 7/2025 | Brochu | |
| 2019/0102702 | A1* | 4/2019 | Belyaev | G06F 16/2272 |
| 2019/0163739 | A1 | 5/2019 | Marascu | |
| 2020/0044992 | A1 | 2/2020 | Kumar | |
| 2020/0117658 | A1 | 4/2020 | Venkata | |
| 2022/0092508 | A1 | 3/2022 | Suthan | |
| 2022/0138697 | A1* | 5/2022 | Neckermann | G06N 5/02 709/204 |
| 2023/0012578 | A1* | 1/2023 | Ding | G06F 16/26 |
| 2023/0057706 | A1 | 2/2023 | Malak | |
| 2023/0081212 | A1* | 3/2023 | Surendran | G06F 16/254 707/736 |
| 2024/0311403 | A1* | 9/2024 | Bursztyn | G06F 16/3325 |
| 2025/0086494 | A1* | 3/2025 | Agarwal | G06N 20/20 |
| 2025/0094188 | A1 | 3/2025 | Vigeant | |
| 2025/0094706 | A1 | 3/2025 | Basavaraju | |

OTHER PUBLICATIONS

Oracle, "Oracle Cloud Infrastructure, Data and AI", Mar. 19, 2021, Copyright © 2021 , 30 pages.

European Patent Office, International Search Authority, Notification of Transmittal of The International Search Report and The Written Opinion of the International Searching Authority, or the Declaration dated Jan. 16, 2025 for International Application No. PCT/US2024/046801 , 15 pages.

United States Patent and Trademark Office, Office Communication dated Mar. 26, 2026 for U.S. Appl. No. 18/883,800, 12 pages.

* cited by examiner

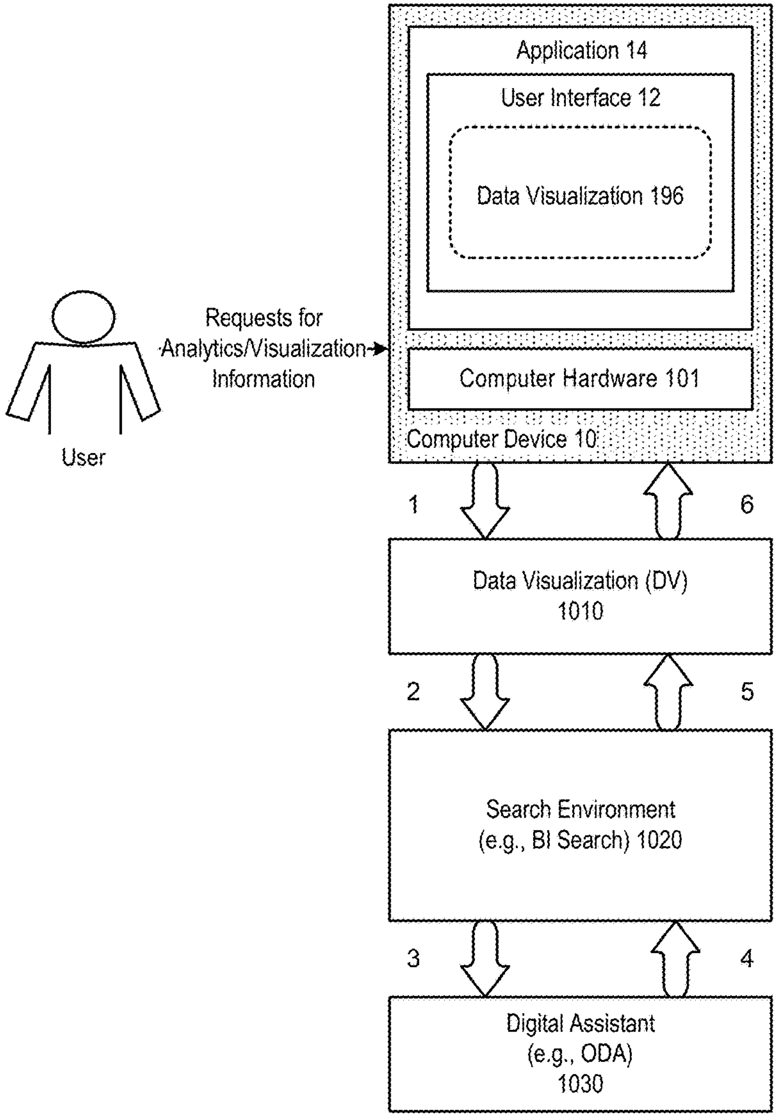

(1) Receive from user via a user interface (e.g., data analytics assistant) a natural language expression, or request to prepare a data visualization (2) Input natural language (with context where appropriate, for example instruction to create a project, e.g., visualization, story, script)

(3) Determine a relevant dataset based on the parsed data visualization request (context supplied with input and/or based on keywords in input), and send natural language input to digital assistant environment (e.g., ODA) based on determination (4) Prepare data visualization request format (e.g., JSON) with resolved intent and entities (5) Generate a project (e.g., visualization, story, script) JSON, and return to data visualization environment for rendering (6) Project is rendered in the user interface

FIGURE 9

SYSTEM AND METHOD FOR PROVIDING A NATURAL LANGUAGE GENERATOR SERVICE FOR USE WITH DATA ANALYTICS ENVIRONMENTS

CLAIM OF PRIORITY

This application claims the benefit of priority to U.S. Provisional Patent Application titled "SYSTEM AND METHOD FOR DIGITAL ASSISTANT INTEGRATION", Application No. 63/538,673, filed Sep. 15, 2023; which application and the contents thereof are herein incorporated by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

Embodiments described herein are generally related to computer data analytics, and are particularly related to a system and method for providing a natural language generator service for use with data analytics environments.

BACKGROUND

Data analytics enables computer-based examination of large amounts of data, for example to derive conclusions or other information from the data. For example, business intelligence tools can be used to provide users with business intelligence describing their enterprise data, in a format that enables the users to make strategic business decisions.

SUMMARY

In accordance with an embodiment, described herein is a system and method for providing a natural language generator service for use with data analytics environments. A data analytics system or environment can be integrated with a digital assistant system or environment which provides natural language processing, for purposes of leveraging a user's text or speech input, within a data analytics or data visualization project, for example while generating, modifying, or interacting with data visualizations.

In accordance with an embodiment, a method for providing a natural language generator service for use with data analytics environments can be provided. The method can provide a computer comprising a microprocessor. The method can run a data analytics system or environment on the computer. The method can receive, at the data analytics system or environment, an input. The method can, upon receiving the input, generate, by the data analytics system or environment, a visualization responsive to the received input. The method can, upon receiving the input, generate, by the data analytics system or environment, via a natural language text generator operating within the data analytics system or environment, a natural language text responsive to the received input and associated with the generated visualization.

BRIEF DESCRIPTION OF THE DRAWINGS

FIG. 9 illustrates a system for providing digital assistant integration with a data analytics assistant, in accordance with an embodiment.

DETAILED DESCRIPTION

Generally described, within an organization, data analytics enables computer-based examination of large amounts of data, for example to derive conclusions or other information from the data. For example, business intelligence (BI) tools can be used to provide users with business intelligence describing their enterprise data, in a format that enables the users to make strategic business decisions.

Increasingly, data analytics can be provided within the context of enterprise software application environments, such as, for example, an Oracle Fusion Applications environment; or within the context of software-as-a-service (SaaS) or cloud environments, such as, for example, an Oracle Analytics Cloud or Oracle Cloud Infrastructure environment; or other types of analytics application or cloud environments.

Examples of data analytics environments and business intelligence tools/servers include Oracle Business Intelligence Server (OBIS), Oracle Analytics Cloud (OAC), and Fusion Analytics Warehouse (FAW), which support features such as data mining or analytics, and analytic applications.

Figure 1:
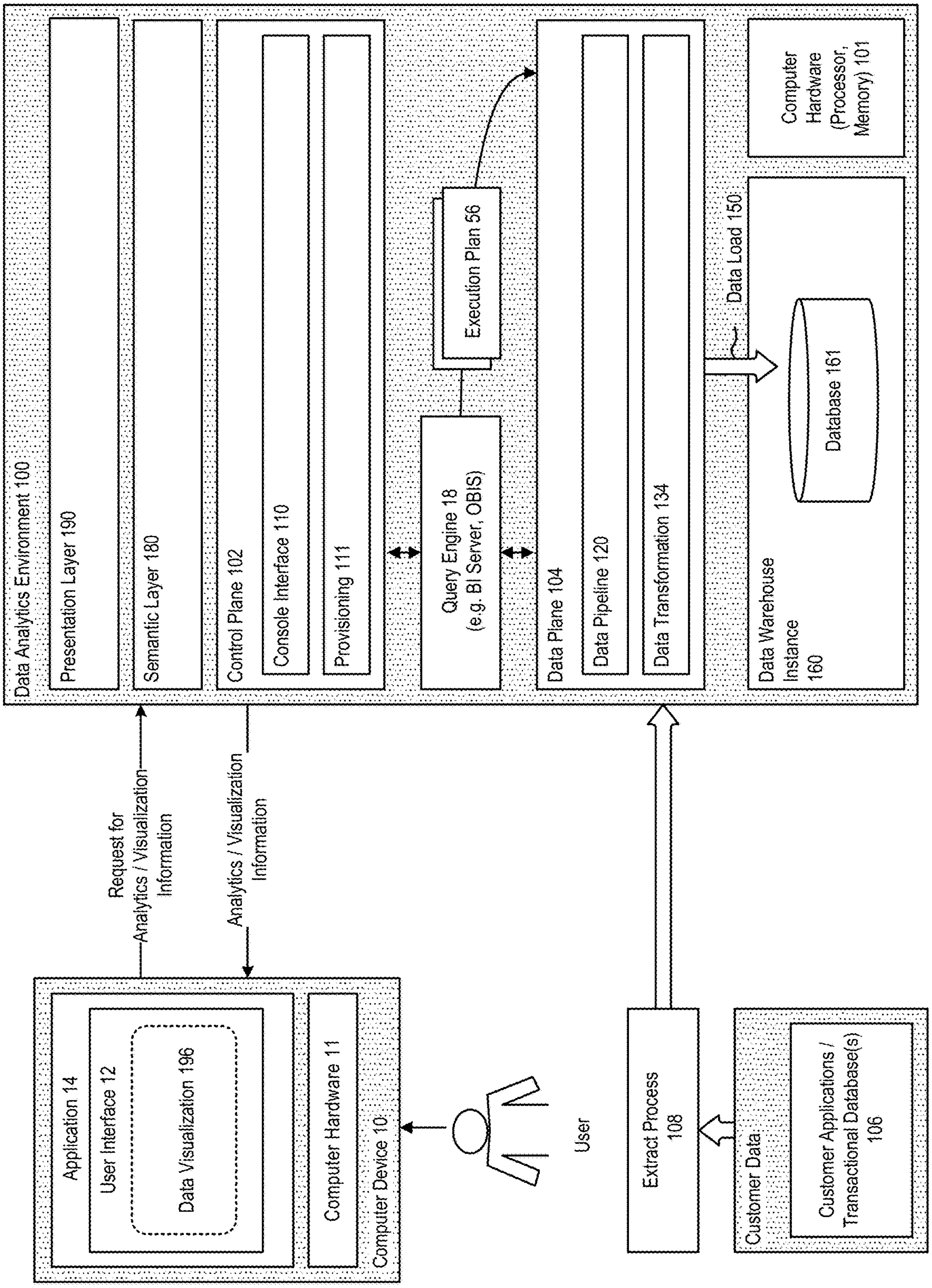
FIG. 1 illustrates an example data analytics environment, in accordance with an embodiment.

FIG. 1 illustrates an example data analytics environment, in accordance with an embodiment.

The example embodiment illustrated in FIG. 1 is provided for purposes of illustrating an example of a data analytics environment in association with which various embodiments described herein can be used. In accordance with other embodiments and examples, the approach described herein can be used with other types of data analytics, database, or data warehouse environments. The components and processes illustrated in FIG. 1, and as further described herein with regard to various other embodiments, can be provided as software or program code executable by, for example, a cloud computing system, or other suitably-programmed computer system.

As illustrated in FIG. 1, in accordance with an embodiment, a data analytics environment 100 can be provided by, or otherwise operate at, a computer system having a computer hardware (e.g., processor, memory) 101, and including one or more software components operating as a control plane 102, and a data plane 104, and providing access to a data warehouse, data warehouse instance 160 (database 161, or other type of data source).

In accordance with an embodiment, the control plane operates to provide control for cloud or other software products offered within the context of a SaaS or cloud environment, such as, for example, an Oracle Analytics Cloud environment, or other type of cloud environment. For example, in accordance with an embodiment, the control plane can include a console interface 110 that enables access by a customer (tenant) and/or a cloud environment having a provisioning component 111.

In accordance with an embodiment, the console interface can enable access by a customer (tenant) operating a graphical user interface (GUI) and/or a command-line interface (CLI) or other interface; and/or can include interfaces for use by providers of the SaaS or cloud environment and its customers (tenants). For example, in accordance with an embodiment, the console interface can provide interfaces that allow customers to provision services for use within their SaaS environment, and to configure those services that have been provisioned.

In accordance with an embodiment, a customer (tenant) can request via the console interface, a number of attributes associated with the data warehouse instance, including required attributes (e.g., login credentials), and optional attributes (e.g., size, or speed). The provisioning component can then provision the requested data warehouse instance, including a customer schema of the data warehouse; and populate the data warehouse instance with the appropriate information supplied by the customer. The provisioning component can also be used to update or edit a data warehouse instance, and/or an ETL process that operates at the data plane, for example, by altering or updating a requested frequency of ETL process runs, for a particular customer (tenant).

In accordance with an embodiment, the data plane can include a data pipeline or process layer 120 and a data transformation layer 134, that together process operational or transactional data from an organization's enterprise software application or data environment, such as, for example, business productivity software applications provisioned in a customer's (tenant's) SaaS environment. The data pipeline or process can include various functionalities that extracts transactional data from business applications and databases that are provisioned in the SaaS environment, and then load a transformed data into the data warehouse.

In accordance with an embodiment, the data transformation layer can include a data model, such as, for example, a knowledge model (KM), or other type of data model, that the system uses to transform the transactional data received from business applications and corresponding transactional databases provisioned in the SaaS environment, into a model format understood by the data analytics environment.

In accordance with an embodiment, the data plane is responsible for performing extract, transform, and load (ETL) operations, including extracting transactional data from an organization's enterprise software application or data environment, such as, for example, business productivity software applications and corresponding transactional databases offered in a SaaS environment, transforming the extracted data into a model format, and loading the transformed data into a customer schema of the data warehouse.

For example, in accordance with an embodiment, each customer (tenant) of the environment can be associated with their own customer tenancy within the data warehouse, that is associated with their own customer schema; and can be additionally provided with read-only access to the data analytics schema, which can be updated by a data pipeline or process, for example, an ETL process, on a periodic or other basis.

In accordance with an embodiment, a data pipeline or process can be scheduled to execute at intervals (e.g., hourly/daily/weekly) to extract transactional data from an enterprise software application or data environment, such as, for example, business productivity software applications and corresponding transactional databases 106 that are provisioned in the SaaS environment.

In accordance with an embodiment, an extract process 108 can extract the transactional data, whereupon extraction the data pipeline or process can insert extracted data into a data staging area, which can act as a temporary staging area for the extracted data. The data quality component and data protection component can be used to ensure the integrity of the extracted data. For example, in accordance with an embodiment, the data quality component can perform validations on the extracted data while the data is temporarily held in the data staging area.

In accordance with an embodiment, when the extract process has completed its extraction, the data transformation layer can be used to begin the transform process, to transform the extracted data into a model format to be loaded into the customer schema of the data warehouse.

In accordance with an embodiment, the data pipeline or process can operate in combination with the data transformation layer to transform data into the model format. The mapping and configuration database can store metadata and data mappings that define the data model used by data transformation. The data and configuration user interface (UI) can facilitate access and changes to the mapping and configuration database.

In accordance with an embodiment, the data transformation layer can transform extracted data into a format suitable for loading into a customer schema of data warehouse, for example according to the data model. During the transformation, the data transformation can perform dimension generation, fact generation, and aggregate generation, as appropriate. Dimension generation can include generating dimensions or fields for loading into the data warehouse instance.

In accordance with an embodiment, after transformation of the extracted data, the data pipeline or process can execute a warehouse load procedure 150, to load the transformed data into the customer schema of the data warehouse instance. Subsequent to the loading of the transformed data into customer schema, the transformed data can be analyzed and used in a variety of additional business intelligence processes.

Different customers of a data analytics environment may have different requirements with regard to how their data is classified, aggregated, or transformed, for purposes of providing data analytics or business intelligence data, or developing software analytic applications. In accordance with an embodiment, to support such different requirements, a semantic layer 180 can include data defining a semantic model of a customer's data; which is useful in assisting users in understanding and accessing that data using commonly-understood business terms; and provide custom content to a presentation layer 190.

In accordance with an embodiment, a semantic model can be defined, for example, in an Oracle environment, as a BI Repository (RPD) file, having metadata that defines logical schemas, physical schemas, physical-to-logical mappings, aggregate table navigation, and/or other constructs that implement the various physical layer, business model and mapping layer, and presentation layer aspects of the semantic model.

In accordance with an embodiment, a customer may perform modifications to their data source model, to support their particular requirements, for example by adding custom facts or dimensions associated with the data stored in their data warehouse instance; and the system can extend the semantic model accordingly.

In accordance with an embodiment, the presentation layer can enable access to the data content using, for example, a software analytic application, user interface, dashboard, key performance indicators (KPI's); or other type of report or interface as may be provided by products such as, for example, Oracle Analytics Cloud, or Oracle Analytics for Applications.

In accordance with an embodiment, a query engine 18 (e.g., an OBIS instance) operates in the manner of a federated query engine to serve analytical queries or requests from clients within, e.g., an Oracle Analytics Cloud environment, directed to data stored at a database.

In accordance with an embodiment, the OBIS instance can push down operations to supported databases, in accordance with a query execution plan 56, wherein a logical query can include Structured Query Language (SQL) statements received from the clients; while a physical query includes database-specific statements that the query engine sends to the database to retrieve data when processing the logical query. In this way the OBIS instance translates business user queries into appropriate database-specific query languages (e.g., Oracle SQL, SQL Server SQL, DB2 SQL, or Essbase MDX). The query engine (e.g., OBIS) can also support internal execution of SQL operators that cannot be pushed down to the databases.

In accordance with an embodiment, a user/developer can interact with a client computer device 10 that includes a computer hardware 11 (e.g., processor, storage, memory), user interface 12, and client application 14. A query engine or business intelligence server such as OBIS generally operates to process inbound, e.g., SQL, requests against a database model, build and execute one or more physical database queries, process the data appropriately, and then return the data in response to the request.

To accomplish this, in accordance with an embodiment, the query engine or business intelligence server can include various components or features, such as a logical or business model or metadata that describes the data available as subject areas for queries; a request generator that takes incoming queries and turns them into physical queries for use with a connected data source; and a navigator that takes the incoming query, navigates the logical model and generates those physical queries that best return the data required for a particular query.

For example, in accordance with an embodiment, a query engine or business intelligence server may employ a logical model mapped to data in a data warehouse, by creating a simplified star schema business model over various data sources so that the user can query data as if it originated at a single source. The information can then be returned to the presentation layer as subject areas, according to business model layer mapping rules.

In accordance with an embodiment, the query engine (e.g., OBIS) can process queries against a database according to a query execution plan. During operation the query engine or business intelligence server can create a query execution plan which can then be further optimized, for example to perform aggregations of data necessary to respond to a request. Data can be combined together and further calculations applied, before the results are returned to the calling application.

In accordance with an embodiment, a request for data analytics or visualization information can be received via a client application and user interface as described above, and communicated to the analytics system (in the example of a cloud environment, via a cloud service). The system can retrieve an appropriate dataset to address the user/business context, for use in generating and returning the requested data analytics or visualization information to the client, as a data visualization 196.

In accordance with an embodiment, a client application can be implemented as software or computer-readable program code executable by a computer system or processing device, and having a user interface, such as, for example, a software application user interface or a web browser interface. The client application can retrieve or access data via an Internet/HTTP or other type of network connection to the analytics system, or in the example of a cloud environment via a cloud service provided by the environment.

Figure 2:
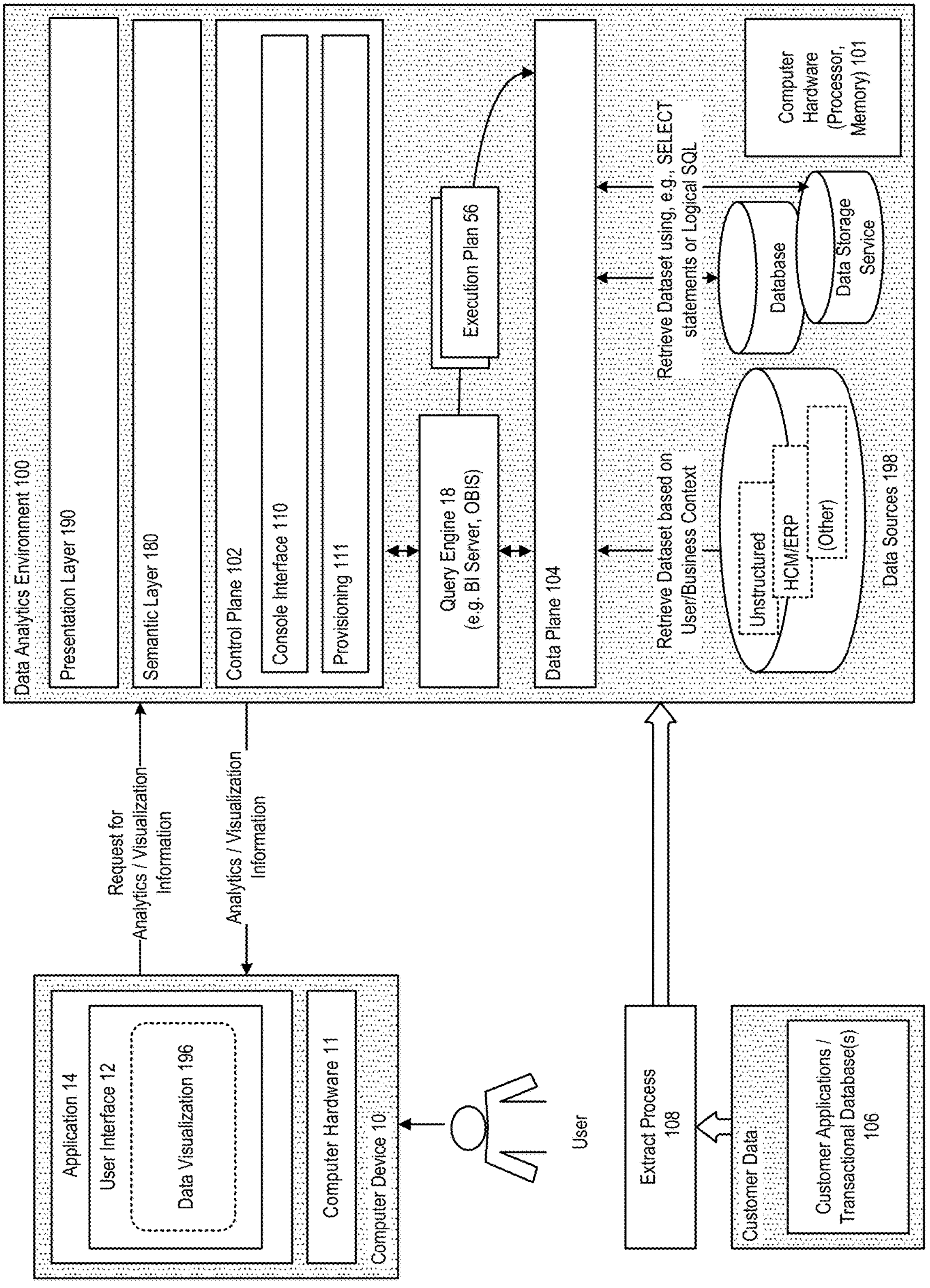
FIG. 2 further illustrates an example data analytics environment, in accordance with an embodiment.

FIG. 2 further illustrates an example data analytics environment, in accordance with an embodiment.

As illustrated in FIG. 2, in accordance with an embodiment, the analytics system enables a dataset to be retrieved, received, or prepared from one or more data source(s) 198, for example via one or more data source connections. Examples of the types of data that can be transformed, analyzed, or visualized using the systems and methods described herein include HCM, HR, or ERP data, e-mail or text messages, or other of free-form or unstructured textual data provided at one or more of a database, data storage service, or other type of data repository or data source.

For example, in accordance with an embodiment, a request for data analytics or visualization information can be received via a client application and user interface as described above, and communicated to the analytics system (in the example of a cloud environment, via a cloud service). The system can retrieve an appropriate dataset to address the user/business context, for use in generating and returning the requested data analytics or visualization information to the client. For example, the data analytics system can retrieve a dataset using, e.g., SELECT statements or Logical SQL instructions.

In accordance with an embodiment, the system provides functionality that allows a user to generate datasets, analyses, or visualizations for display within a user interface, for example to explore datasets or data sourced from multiple data sources.

In accordance with an embodiment, the provisioning component can also comprise a provisioning application programming interface (API), a number of workers, a metering manager, and a data plane API, as further described below. The console interface can communicate, for example, by making API calls, with the provisioning API when commands, instructions, or other inputs are received at the console interface to provision services within the SaaS environment, or to make configuration changes to provisioned services.

In accordance with an embodiment, the data plane API can communicate with the data plane. For example, in accordance with an embodiment, provisioning and configuration changes directed to services provided by the data plane can be communicated to the data plane via the data plane API.

In accordance with an embodiment, the metering manager can include various functionality that meters services and usage of services provisioned through control plane. For example, in accordance with an embodiment, the metering manager can record a usage over time of processors provisioned via the control plane, for particular customers (tenants), for billing purposes. Likewise, the metering manager can record an amount of storage space of data warehouse partitioned for use by a customer of the SaaS environment, for billing purposes.

In accordance with an embodiment, the data pipeline or process, provided by the data plane, can include a monitoring component, a data staging component, a data quality component, and a data projection component, as further described below.

In accordance with an embodiment, the data transformation layer can include a dimension generation component, fact generation component, and aggregate generation component, as further described below. The data plane can also include a data and configuration user interface, and mapping and configuration database.

In accordance with an embodiment, the data warehouse can include a default data analytics schema (referred to herein in accordance with some embodiments as an analytic warehouse schema) 162 and, for each customer (tenant) of the system, a customer schema 164.

In accordance with an embodiment, to support multiple tenants, the system can enable the use of multiple data warehouses or data warehouse instances. For example, in accordance with an embodiment, a first warehouse customer tenancy for a first tenant can comprise a first database instance, a first staging area, and a first data warehouse instance of a plurality of data warehouses or data warehouse instances; while a second customer tenancy for a second tenant can comprise a second database instance, a second staging area, and a second data warehouse instance of the plurality of data warehouses or data warehouse instances.

In accordance with an embodiment, based on the data model defined in the mapping and configuration database, the monitoring component can determine dependencies of several different datasets (data sets) to be transformed. Based on the determined dependencies, the monitoring component can determine which of several different datasets should be transformed to the model format first.

For example, in accordance with an embodiment, if a first model dataset incudes no dependencies on any other model dataset; and a second model dataset includes dependencies to the first model dataset; then the monitoring component can determine to transform the first dataset before the second dataset, to accommodate the second dataset's dependencies on the first dataset.

For example, in accordance with an embodiment, dimensions can include categories of data such as, for example, "name," "address," or "age". Fact generation includes the generation of values that data can take, or "measures." Facts can be associated with appropriate dimensions in the data warehouse instance. Aggregate generation includes creation of data mappings which compute aggregations of the transformed data to existing data in the customer schema of data warehouse instance.

In accordance with an embodiment, once any transformations are in place (as defined by the data model), the data pipeline or process can read the source data, apply the transformation, and then push the data to the data warehouse instance.

In accordance with an embodiment, data transformations can be expressed in rules, and once the transformations take place, values can be held intermediately at the staging area, where the data quality component and data projection components can verify and check the integrity of the transformed data, prior to the data being uploaded to the customer schema at the data warehouse instance. Monitoring can be provided as the extract, transform, load process runs, for example, at a number of compute instances or virtual machines. Dependencies can also be maintained during the extract, transform, load process, and the data pipeline or process can attend to such ordering decisions.

In accordance with an embodiment, after transformation of the extracted data, the data pipeline or process can execute a warehouse load procedure, to load the transformed data into the customer schema of the data warehouse instance. Subsequent to the loading of the transformed data into customer schema, the transformed data can be analyzed and used in a variety of additional business intelligence processes.

Figure 3:
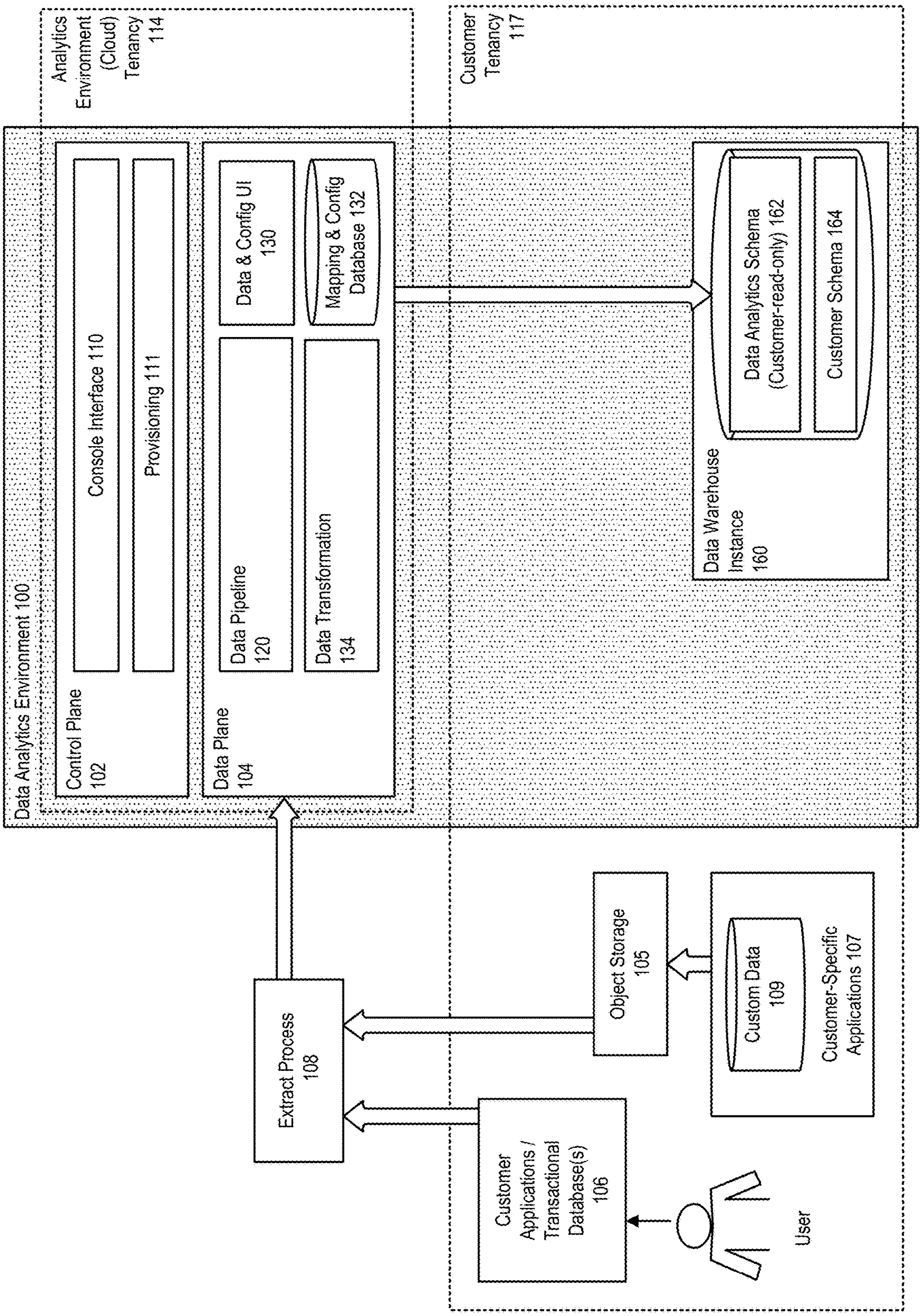
FIG. 3 further illustrates an example data analytics environment, in accordance with an embodiment.

FIG. 3 further illustrates an example data analytics environment, in accordance with an embodiment.

As illustrated in FIG. 3, in accordance with an embodiment, data can be sourced, e.g., from a customer's (tenant's) enterprise software application or data environment (106), using the data pipeline process; or as custom data 109 sourced from one or more customer-specific applications 107; and loaded to a data warehouse instance, including in some examples the use of an object storage 105 for storage of the data.

In accordance with embodiments of analytics environments such as, for example, Oracle Analytics Cloud (OAC), a user can create a dataset that uses tables from different connections and schemas. The system uses the relationships defined between these tables to create relationships or joins in the dataset.

In accordance with an embodiment, for each customer (tenant), the system uses the data analytics schema that is maintained and updated by the system, within a system/cloud tenancy 114, to pre-populate a data warehouse instance for the customer, based on an analysis of the data within that customer's enterprise applications environment, and within a customer tenancy 117. As such, the data analytics schema maintained by the system enables data to be retrieved, by the data pipeline or process, from the customer's environment, and loaded to the customer's data warehouse instance.

In accordance with an embodiment, the system also provides, for each customer of the environment, a customer schema that is readily modifiable by the customer, and which allows the customer to supplement and utilize the data within their own data warehouse instance. For each customer, their resultant data warehouse instance operates as a database whose contents are partly-controlled by the customer; and partly-controlled by the environment (system).

For example, in accordance with an embodiment, a data warehouse (e.g., ADW) can include a data analytics schema and, for each customer/tenant, a customer schema sourced from their enterprise software application or data environment. The data provisioned in a data warehouse tenancy (e.g., an ADW cloud tenancy) is accessible only to that tenant; while at the same time allowing access to various, e.g., ETL-related or other features of the shared environment.

In accordance with an embodiment, to support multiple customers/tenants, the system enables the use of multiple data warehouse instances; wherein for example, a first customer tenancy can comprise a first database instance, a first staging area, and a first data warehouse instance; and a second customer tenancy can comprise a second database instance, a second staging area, and a second data warehouse instance.

In accordance with an embodiment, for a particular customer/tenant, upon extraction of their data, the data pipeline or process can insert the extracted data into a data staging area for the tenant, which can act as a temporary staging area for the extracted data. A data quality component and data protection component can be used to ensure the integrity of the extracted data; for example, by performing validations on the extracted data while the data is temporarily held in the data staging area. When the extract process has completed its extraction, the data transformation layer can be used to begin the transformation process, to transform the extracted data into a model format to be loaded into the customer schema of the data warehouse.

Figure 4:
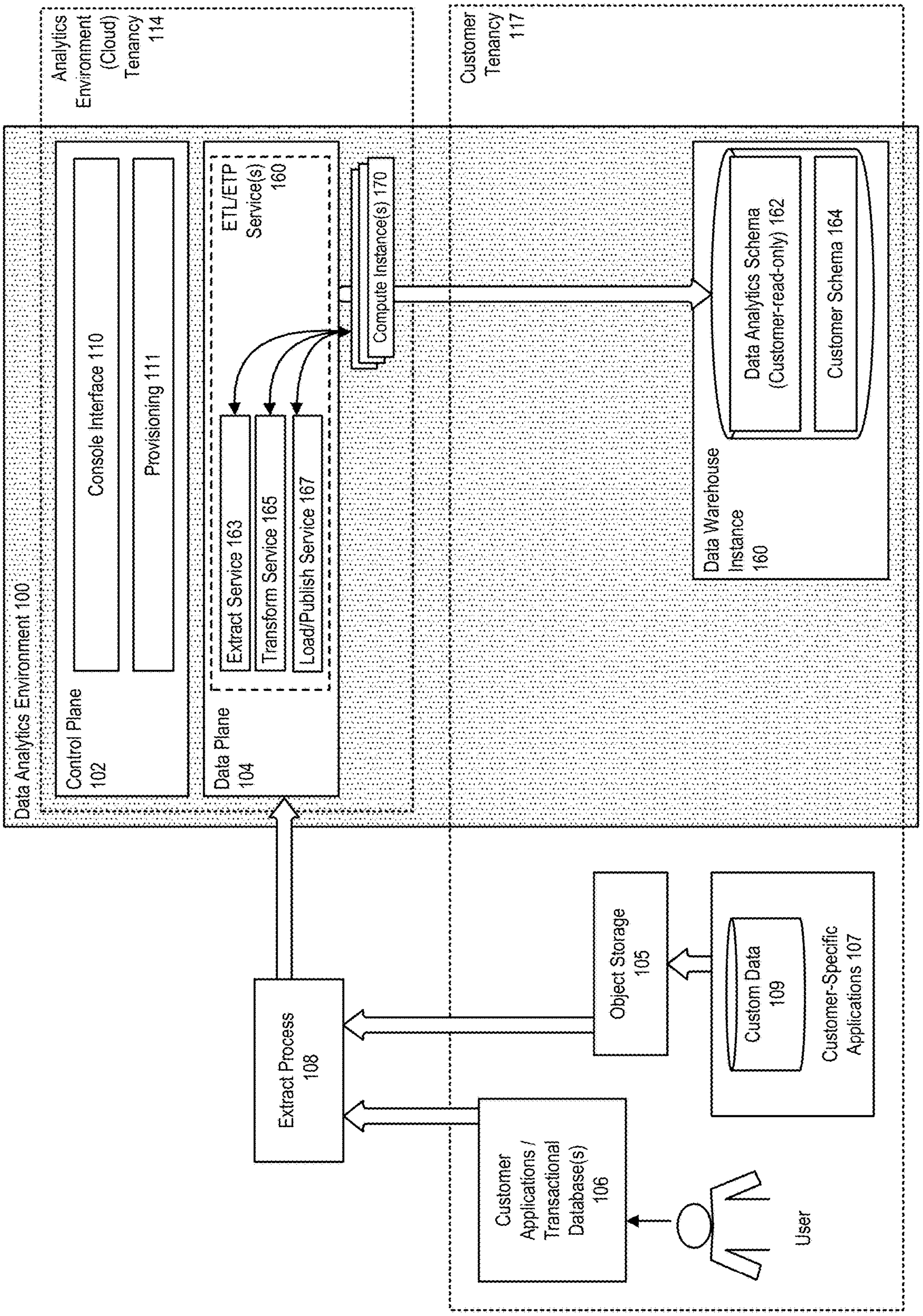
FIG. 4 further illustrates an example data analytics environment, in accordance with an embodiment.

FIG. 4 further illustrates an example data analytics environment, in accordance with an embodiment.

As illustrated in FIG. 4, in accordance with an embodiment, the process of extracting data, e.g., from a customer's (tenant's) enterprise software application or data environment, using the data pipeline process as described above; or as custom data sourced from one or more customer-specific applications; and loading the data to a data warehouse instance, or refreshing the data in a data warehouse, generally involves three broad stages, performed by an ETP service 160 or process, including one or more extraction service 163; transformation service 165; and load/publish service 167, executed by one or more compute instance(s) 170.

For example, in accordance with an embodiment, a list of view objects for extractions can be submitted, for example, to an Oracle BI Cloud Connector (BICC) component via a REST call. The extracted files can be uploaded to an object storage component, such as, for example, an Oracle Storage Service (OSS) component, for storage of the data. The transformation process takes the data files from object storage component (e.g., OSS), and applies a business logic while loading them to a target data warehouse, e.g., an ADW database, which is internal to the data pipeline or process, and is not exposed to the customer (tenant). A load/publish service or process takes the data from the, e.g., ADW database or warehouse, and publishes it to a data warehouse instance that is accessible to the customer (tenant).

Figure 5:
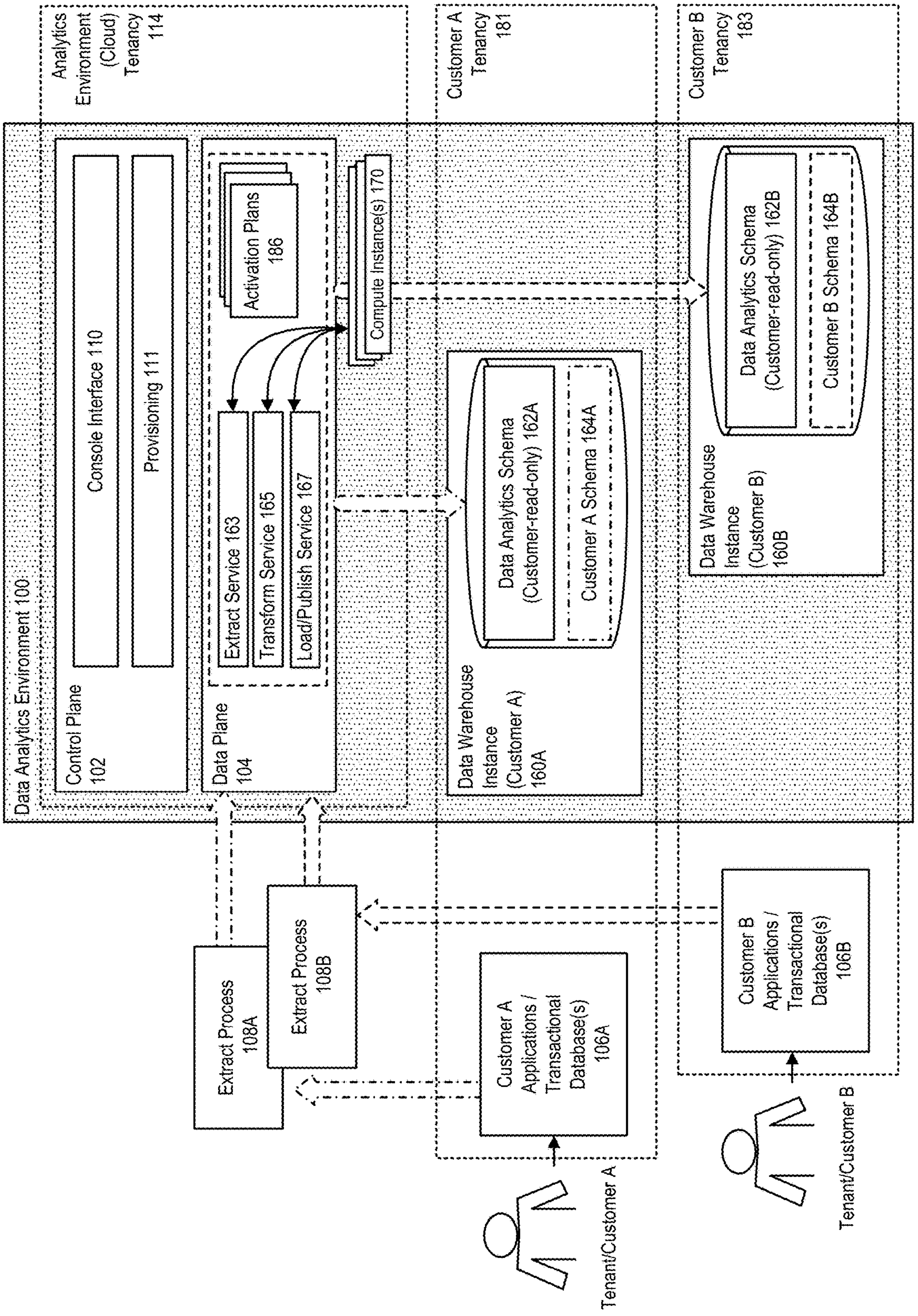
FIG. 5 further illustrates an example data analytics environment, in accordance with an embodiment.

FIG. 5 further illustrates an example data analytics environment, in accordance with an embodiment.

As illustrated in FIG. 5, which illustrates the operation of the system with a plurality of tenants (customers) in accordance with an embodiment, data can be sourced, e.g., from each of a plurality of customer's (tenant's) enterprise software application or data environment, using the data pipeline process as described above; and loaded to a data warehouse instance.

In accordance with an embodiment, the data pipeline or process maintains, for each of a plurality of customers (tenants), for example customer A 180, customer B 182, a data analytics schema that is updated on a periodic basis, by the system in accordance with best practices for a particular analytics use case.

In accordance with an embodiment, for each of a plurality of customers (e.g., customers A, B), the system uses the data analytics schema 162A, 162B, that is maintained and updated by the system, to pre-populate a data warehouse instance for the customer, based on an analysis of the data within that customer's enterprise applications environment 106A, 106B, and within each customer's tenancy (e.g., customer A tenancy 181, customer B tenancy 183); so that data is retrieved, by the data pipeline or process, from the customer's environment, and loaded to the customer's data warehouse instance 160A, 160B.

In accordance with an embodiment, the data analytics environment also provides, for each of a plurality of customers of the environment, a customer schema (e.g., customer A schema 164A, customer B schema 164B) that is readily modifiable by the customer, and which allows the customer to supplement and utilize the data within their own data warehouse instance.

As described above, in accordance with an embodiment, for each of a plurality of customers of the data analytics environment, their resultant data warehouse instance operates as a database whose contents are partly-controlled by the customer; and partly-controlled by the data analytics environment (system); including that their database appears pre-populated with appropriate data that has been retrieved from their enterprise applications environment to address various analytics use cases. When the extract process 108A, 108B for a particular customer has completed its extraction, the data transformation layer can be used to begin the transformation process, to transform the extracted data into a model format to be loaded into the customer schema of the data warehouse.

In accordance with an embodiment, activation plans 186 can be used to control the operation of the data pipeline or process services for a customer, for a particular functional area, to address that customer's (tenant's) particular needs.

For example, in accordance with an embodiment, an activation plan can define a number of extract, transform, and load (publish) services or steps to be run in a certain order, at a certain time of day, and within a certain window of time.

In accordance with an embodiment, each customer can be associated with their own activation plan(s). For example, an activation plan for a first Customer A can determine the tables to be retrieved from that customer's enterprise software application environment (e.g., their Fusion Applications environment), or determine how the services and their processes are to run in a sequence; while an activation plan for a second Customer B can likewise determine the tables to be retrieved from that customer's enterprise software application environment, or determine how the services and their processes are to run in a sequence.

Figure 6:
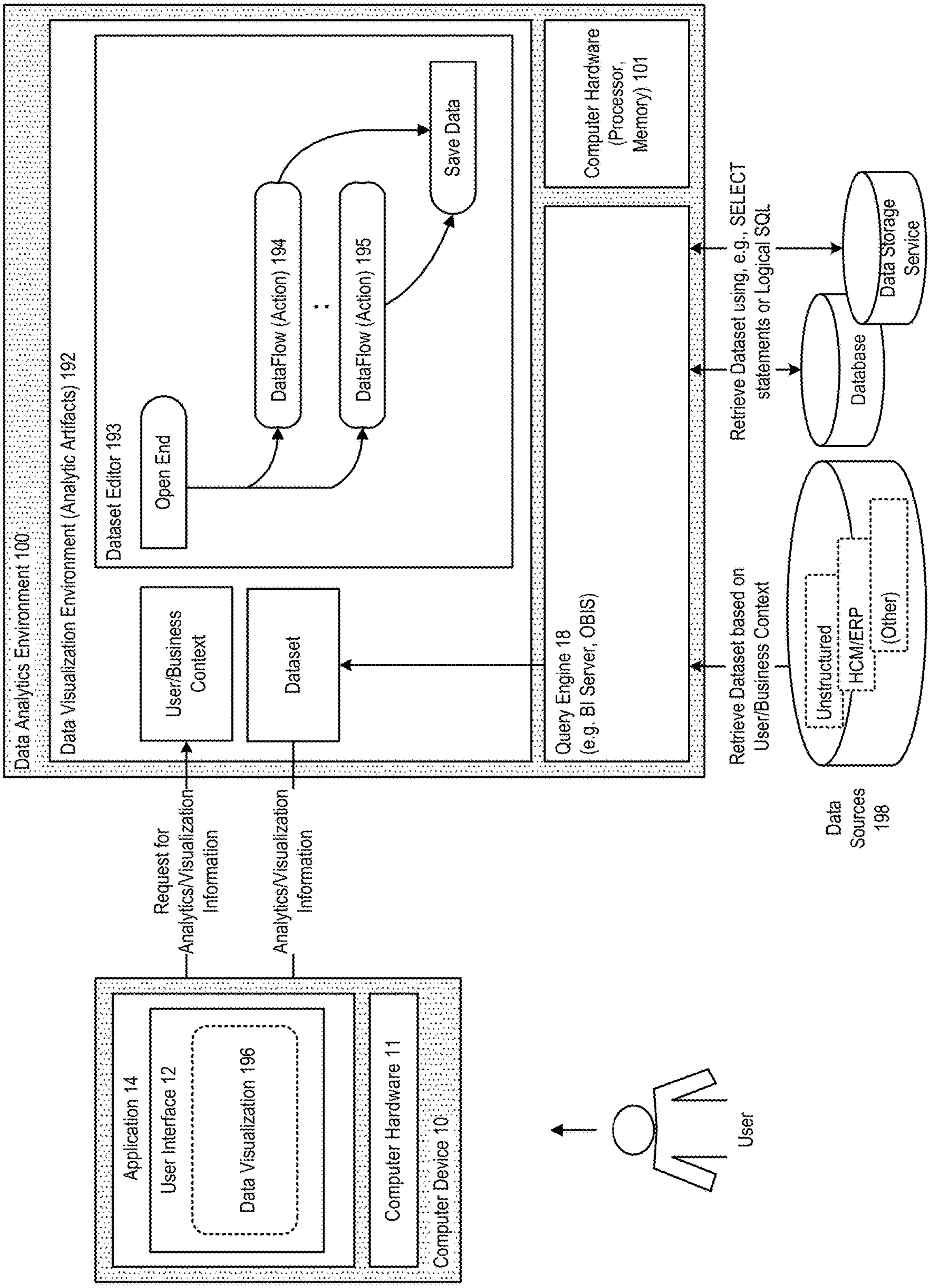
FIG. 6 illustrates a use of the system to transform, analyze, or visualize data, in accordance with an embodiment.

FIG. 6 illustrates a use of the system to transform, analyze, or visualize data, in accordance with an embodiment.

As illustrated in FIG. 6, in accordance with an embodiment, the systems and methods disclosed herein can be used to provide a data visualization environment 192 that enables insights for users of an analytics environment with regard to analytic artifacts and relationships among the same. A model can then be used to visualize relationships between such analytic artifacts via, e.g., a user interface, as a network chart or visualization of relationships and lineage between artifacts (e.g., User, Role, DV Project, Dataset, Connection, Dataflow, Sequence, ML Model, ML Script).

In accordance with an embodiment, a client application can be implemented as software or computer-readable program code executable by a computer system or processing device, and having a user interface, such as, for example, a software application user interface or a web browser interface. The client application can retrieve or access data via an Internet/HTTP or other type of network connection to the analytics system, or in the example of a cloud environment via a cloud service provided by the environment.

In accordance with an embodiment, the user interface can include or provide access to various dataflow action types, as described in further detail below, that enable self-service text analytics, including allowing a user to display a dataset, or interact with the user interface to transform, analyze, or visualize the data, for example to generate graphs, charts, or other types of data analytics or visualizations of dataflows.

In accordance with an embodiment, the analytics system enables a dataset to be retrieved, received, or prepared from one or more data source(s), for example via one or more data source connections. Examples of the types of data that can be transformed, analyzed, or visualized using the systems and methods described herein include HCM, HR, or ERP data, e-mail or text messages, or other of free-form or unstructured textual data provided at one or more of a database, data storage service, or other type of data repository or data source.

For example, in accordance with an embodiment, a request for data analytics or visualization information can be received via a client application and user interface as described above, and communicated to the analytics system (in the example of a cloud environment, via a cloud service). The system can retrieve an appropriate dataset to address the user/business context, for use in generating and returning the requested data analytics or visualization information to the client. For example, the data analytics system can retrieve a dataset using, e.g., SELECT statements or Logical SQL instructions.

In accordance with an embodiment, the system can create a model or dataflow that reflects an understanding of the dataflow or set of input data, by applying various algorithmic processes, to generate visualizations or other types of useful information associated with the data. The model or dataflow can be further modified within a dataset editor 193 by applying various processing or techniques to the dataflow or set of input data, including for example one or more dataflow actions 194, 195 or steps that operate on the dataflow or set of input data. A user can interact with the system via a user interface, to control the use of dataflow actions to generate data analytics, data visualizations 196, or other types of useful information associated with the data.

In accordance with an embodiment, datasets are self-service data models that a user can build for data visualization and analysis requirements. A dataset contains data source connection information, tables, and columns, data enrichments and transformations. A user can use a dataset in multiple workbooks and in dataflows.

In accordance with an embodiment, when a user creates and builds a dataset, they can, for example: choose between many types of connections or spreadsheets; create datasets based on data from multiple tables in a database connection, an Oracle data source, or a local subject area; or create datasets based on data from tables in different connections and subject areas.

For example, in accordance with an embodiment, a user can build a dataset that includes tables from an Autonomous Data Warehouse connection, tables from a Spark connection, and tables from a local subject area; specify joins between tables; and transform and enrich the columns in the dataset.

In accordance with an embodiment, additional artifacts, features, and operations associated with datasets can include, for example:

View available connections: a dataset uses one or more connections to data sources to access and supply data for analysis and visualization. A user list of connections contains the connections that they built and the connections that they have permission to access and use.

Create a dataset from a connection: when a user creates a dataset, they can add tables from one or more data source connections, add joins, and enrich data.

Add multiple connections to a dataset: a dataset can include more than one connection. Adding more connections allows a user to access and join all of the tables and data that they need to build the dataset. The user can add more connections to datasets that support multiple tables.

Create dataset table joins: joins indicate relationships between a dataset's tables. If the user is creating a dataset based on facts and dimensions and if joins already exist in the source tables, then joins are automatically created in the dataset. If the user is creating a dataset from multiple connections and schemas, then they can manually define the joins between tables.

In accordance with an embodiment, a user can use dataflows to create datasets by combining, organizing, and integrating data. Dataflows enable the user to organize and integrate data to produce curated datasets that either they or other users can visualize.

For example, in accordance with an embodiment, a user might use a dataflow to: Create a dataset; combine data from different source; aggregate data; and train a machine learning model or apply a predictive machine learning model to their data.

In accordance with an embodiment, a dataset editor as described above allows a user to add actions or steps, wherein each step performs a specific function, for example, add data, join tables, merge columns, transform data, or save the data. Each step is validated when the user adds or changes it. When they have configured the dataflow, they can execute it to produce or update a dataset.

In accordance with an embodiment, a user can curate data from datasets, subject areas, or database connections. The user can execute dataflows individually or in a sequence. The user can include multiple data sources in a dataflow and specify how to join them. The user can save the output data from a dataflow in either a dataset or in a supported database type.

In accordance with an embodiment, additional artifacts, features, and operations associated with dataflows can include, for example:

Add columns: add custom columns to a target dataset.

Add data: add data sources to a dataflow. For example, if the user is merging two datasets, they add both datasets to the dataflow.

Aggregate: create group totals by applying aggregate functions; for example, count, sum, or average.

Branch: creates multiple outputs from a dataflow.

Filter: select only the data that the user is interested in.

Join: combine data from multiple data sources using a database join based on a common column.

Graph Analytics: perform geo-spatial analysis, such as calculating the distance or the number of hops between two vertices.

The above are provided by way of example; in accordance with an embodiment other types of steps can be added to a dataflow to transform a dataset or provide data analytics or visualizations.

Dataset Analyses and Visualizations

Figure 7:
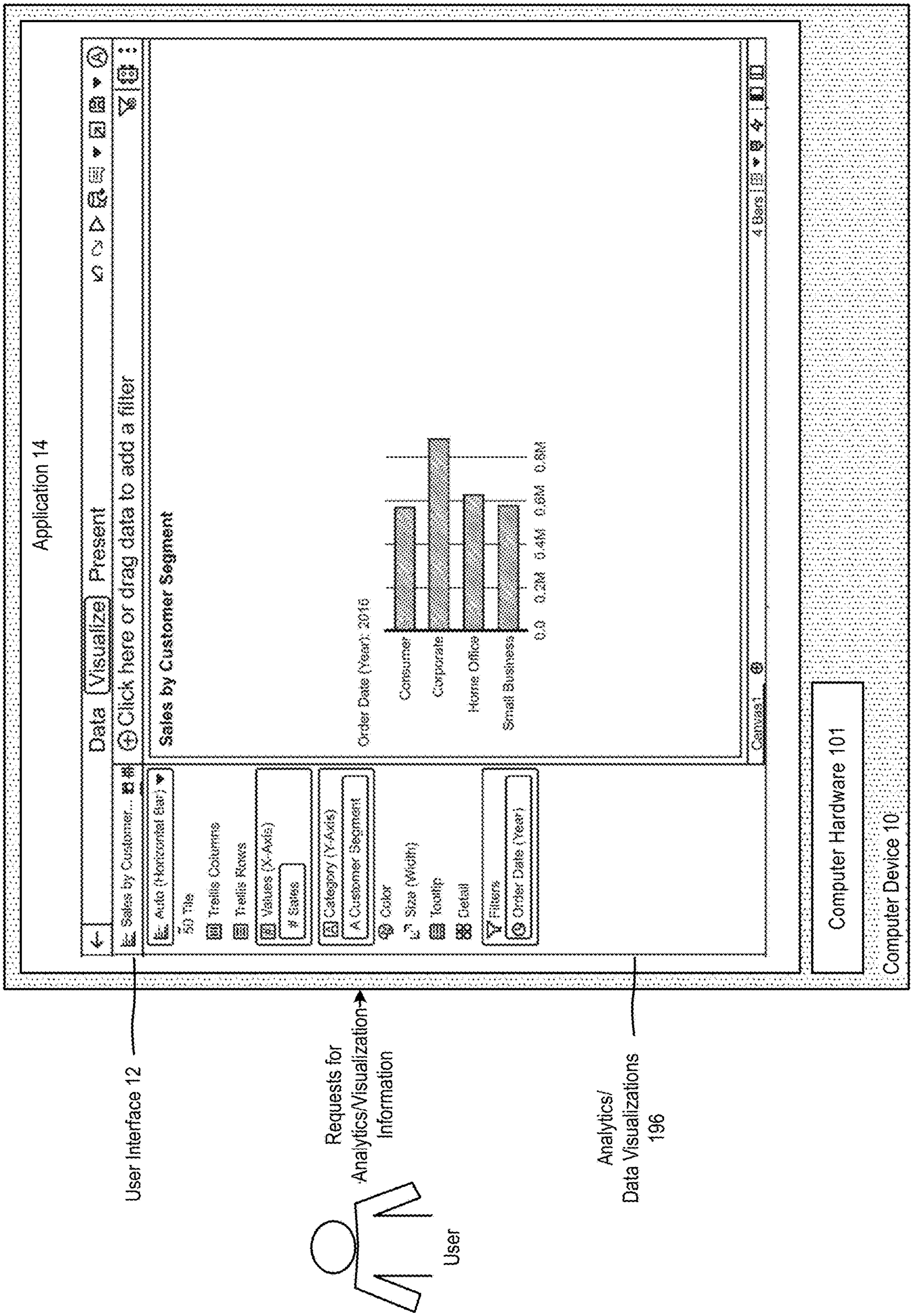
FIG. 7 illustrates the preparation of a data visualization for use with a data analytics environment, in accordance with an embodiment.
Figure 8:
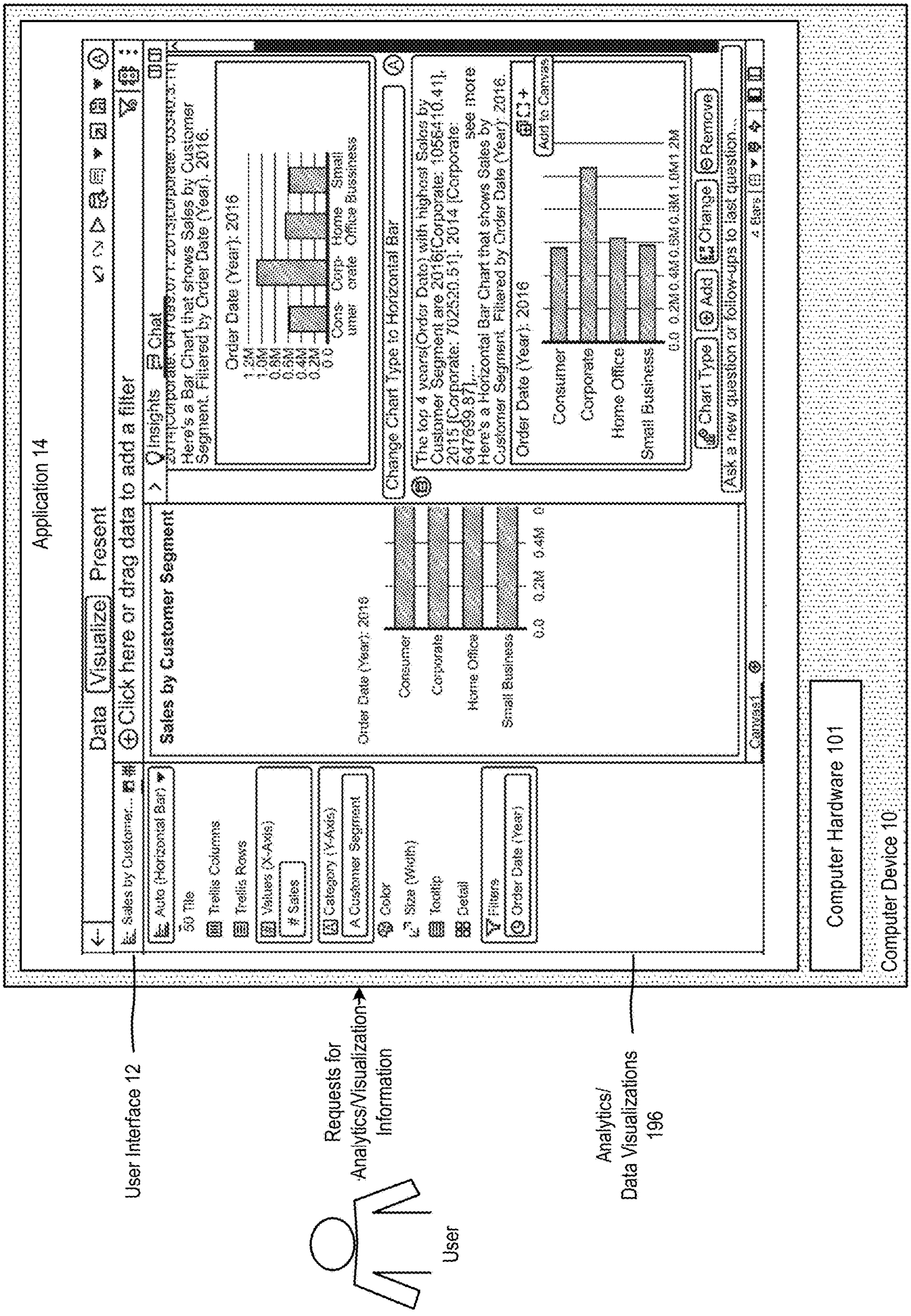
FIG. 8 further illustrates the preparation of a data visualization for use with a data analytics environment, in accordance with an embodiment.

FIGS. 7-8 illustrate the preparation of a data visualization for use with a data analytics environment, in accordance with an embodiment.

The user interfaces and features shown in FIGS. 7-8 and elsewhere herein are provided by way of example, for purposes of illustration of the various features described herein; in accordance with various embodiments, alternative examples of user interfaces and features can be provided.

As illustrated in FIGS. 7-8, in accordance with an embodiment, the system allows a user to prepare a data visualization for use with a dataset. A panel of visualization options allows users to add data visualization elements to a workbook or canvas, to create a dashboard or data visualization. The user can create a workbook, add a dataset, and then drag and drop its columns onto a canvas to create visualizations.

In accordance with an embodiment, the system can automatically generate a visualization based on the contents of the canvas, with one or more visualization types automatically selected for selection by the user.

In accordance with an embodiment, the user can continue adding data elements directly to the canvas to build the visualization. In this manner, a dataset operates as a self-service data model from which the user can build a data analysis or visualization. The user can then use the data visualization to access the data analytics environment, for example to submit analyses or queries against an organization's data, or explore datasets or data sourced from multiple data sources. In accordance with an embodiment, dataflows can be used to merge datasets, cleanse data, and output the results to a new dataset.

In accordance with an embodiment, the system can provide automatically generated data visualizations (automatically-generated insights, auto-insights), by suggesting visualizations which are expected to provide the best insights for a particular dataset. The user can review an insight's automatically generated summary, for example by hovering over the associated visualization in the workbook canvas.

Data Analytics Assistant

In accordance with an embodiment, a data analytics system or environment can be integrated with a digital assistant which provides natural language processing capabilities, for purposes of leveraging the natural language processing of a user's text or speech input, within a data analytics or data visualization project, for example while generating, modifying, or interacting with data visualizations, or generating a story or script that includes or is descriptive of data visualizations.

For example, in accordance with an embodiment a data analytics system or environment, for example an Oracle Analytics Cloud (OAC) environment, can be integrated with a digital assistant system or environment, for example an Oracle Digital Assistant (ODA) environment, which provides natural language processing (NLP) and speech processing capabilities, for purposes of leveraging the natural language (NL) processing of a user's text or speech input, within a data analytics or data visualization project, for example while generating, modifying, or interacting with data visualizations.

FIG. 9 illustrates a system for providing digital assistant integration with a data analytics assistant, in accordance with an embodiment.

As illustrated in FIG. 9, in accordance with an embodiment, at (1) a data analytics system or environment, for example an Oracle Analytics Cloud (OAC) environment, receives as input from a user via a user interface (e.g., data analytics assistant) a natural language expression, or request to prepare a data visualization 1010.

At (2), the input natural language can be associated with a context where appropriate, for example an instruction to create a project, e.g., visualization, story, script.

At (3), a relevant dataset can be determined (e.g., by a search component 1020 such as BI Search) based on the parsed data visualization request (context supplied with input and/or based on keywords in input). Based upon the determination of the relevant dataset, the natural language input can be sent to a digital assistant environment 1030 (for example an Oracle Digital Assistant (ODA) environment, which provides natural language processing (NLP) and speech processing capabilities, for purposes of leveraging the natural language (NL) processing of the natural language expression, e.g., a user's text or speech input.

At (4), a data visualization request format (e.g., JSON) can be prepared with resolved intent and entities.

At (5), an (e.g., ODA) JSON data is prepared with resolved intent and entities and returned to the data visualization (DV) environment for rendering.

At (6), the data analytics or data visualization project is rendered in the user interface (UI).

Natural Language Input

In accordance with an embodiment, the system supports the use of natural language input, to generate simple and insightful natural language text for a given visualization. A simple text explains the data behind the visualization, whereas an insightful text is meant to provide related but useful insights about the columns and the data surrounding them in the visualization. The data analytics assistant can then use the insights generation feature to fetch and display related insights for the visualization.

Figure 10:
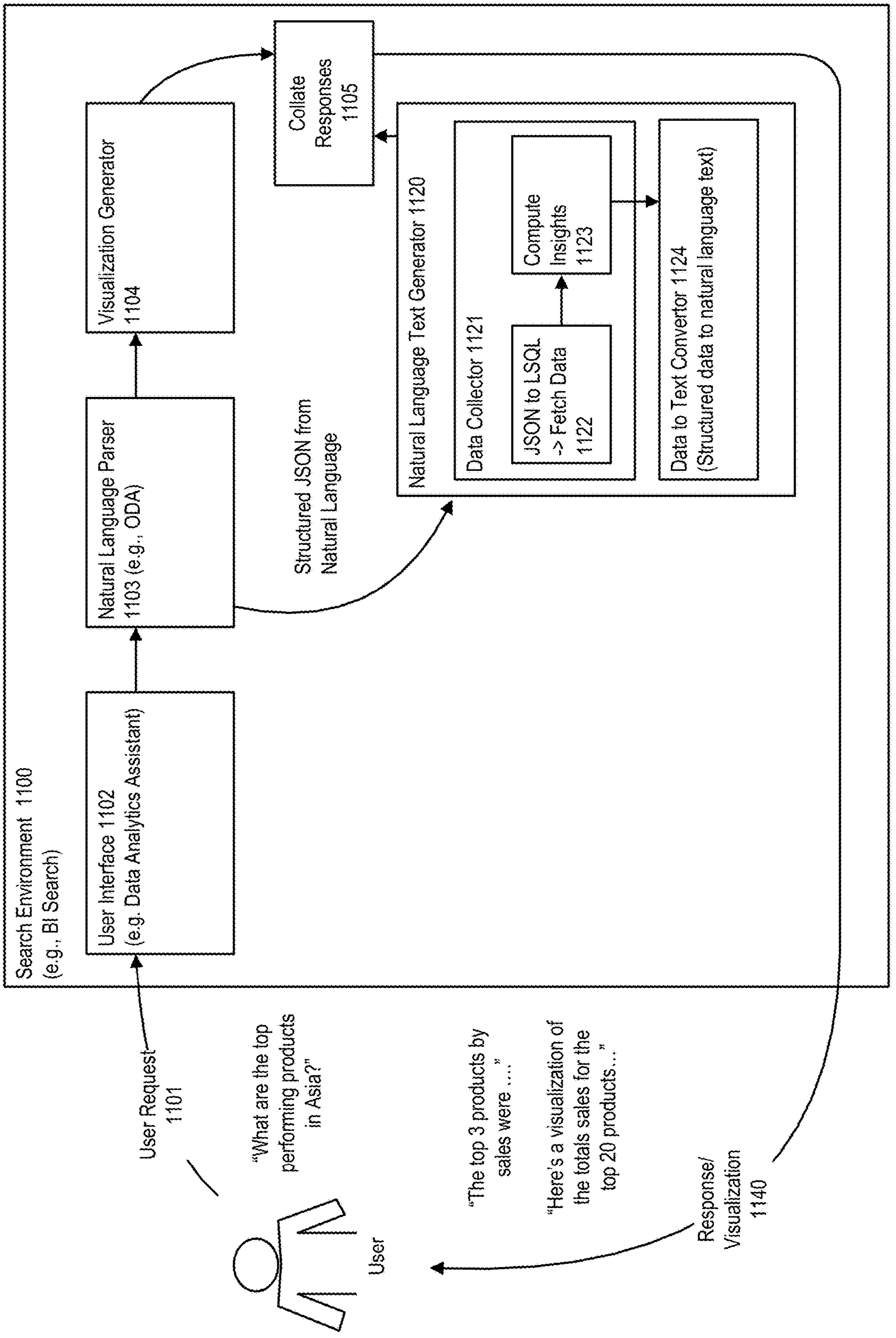
FIG. 10 illustrates the use of natural language to support digital assistant integration, in accordance with an embodiment.

FIG. 10 illustrates the use of natural language to support digital assistant integration, in accordance with an embodiment.

As illustrated in FIG. 10, in accordance with an embodiment, a user can interact with a user interface 1102 of a search environment 1100 (e.g., BI Search) via a natural language utterance/input. A request 1101 can be passed to a natural language parser 1103 (e.g., ODA) and parsed for use by a visualization generator 1104 and natural language text generator 1120 comprising a data collector 1121 and data to text converter 1124. Responses (for example insights 1122, 1123) can be collated 1105 in order to provide a response/visualization 1140 to the user interface.

For example, a user request received at the user interface, such as for example "What are the top performing products in Asia?" is parsed by a natural language parser and passed to a visualization generator. A natural language text generator can then be used to generate a response associated with a visualization, such as for example "The top 3 products by sales were . . . Here's a visualization of the totals sales for the top 20 products . . . ".

User Interaction with Data Analytics Environments

Figure 11:
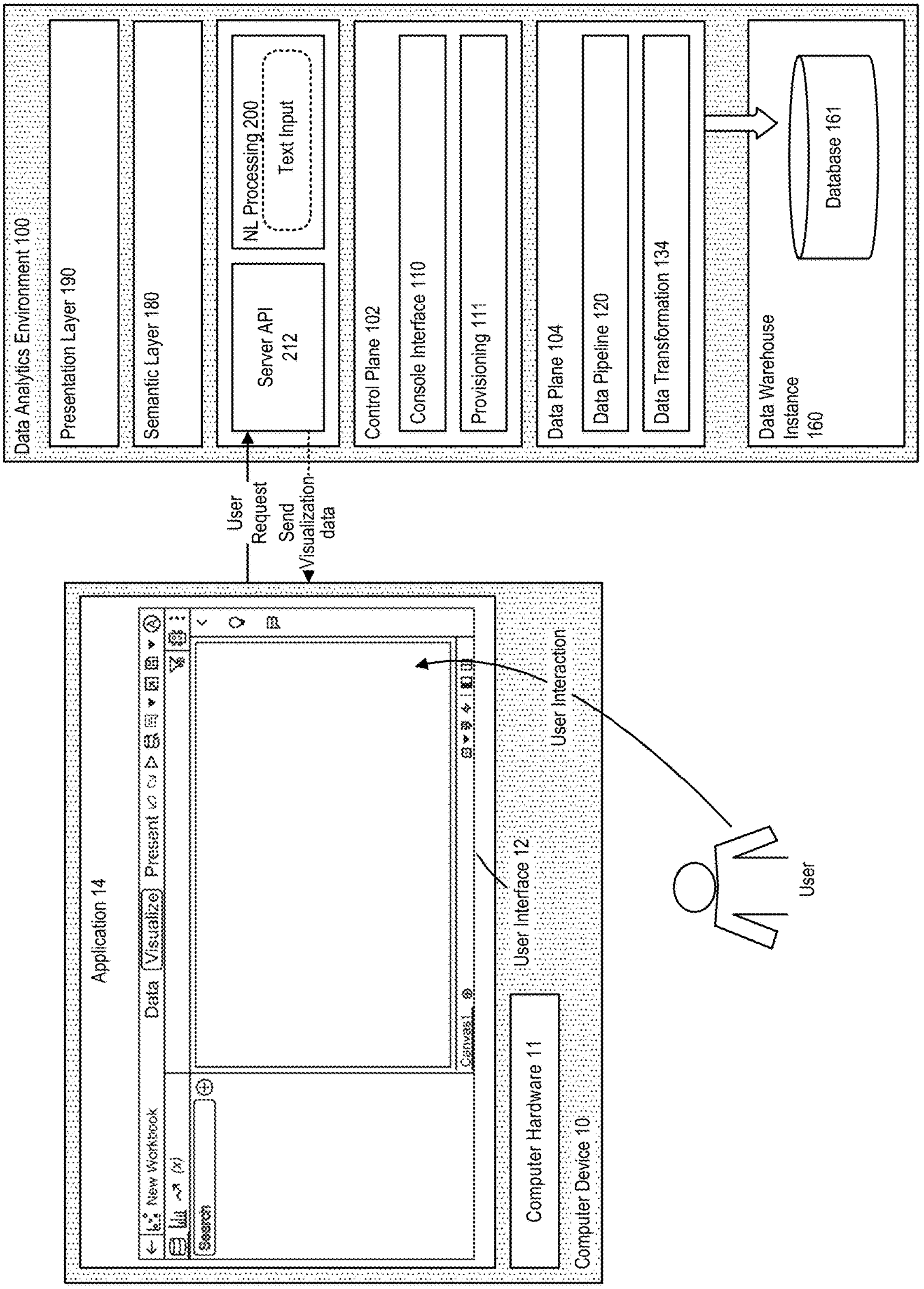
FIG. 11 illustrates an example user interaction with a data analytics environment, to generate analytic information or visualizations, in accordance with an embodiment.

FIG. 11 illustrates an example user interaction with a data analytics environment, to generate analytic information or visualizations, in accordance with an embodiment.

As illustrated in FIG. 11, in accordance with an embodiment, when the user starts an exploration, using a computer device in communication with a server API 212, the data analytics system can, based on natural language processing 200, present the user with dynamic insights about their data which they can review and choose from. The user can then continue adding data elements directly to the canvas, for example using a chat-like interface, to continue building their visualization.

Natural Language Generator (NLG) Service

In accordance with an embodiment, a Natural Language Generator (NLG) can comprise a service, provided within a cloud environment, such as OAC, that can generate simple and insightful natural language text for a given visualization. Generated simple text explains the data behind the visualization, whereas generated insightful text is meant to provide related but useful insights about the columns and the data surrounding them in the visualization. A workbook assistant can, for example, use the insights text generation feature to fetch and display related insights for the visualization.

Figure 12:
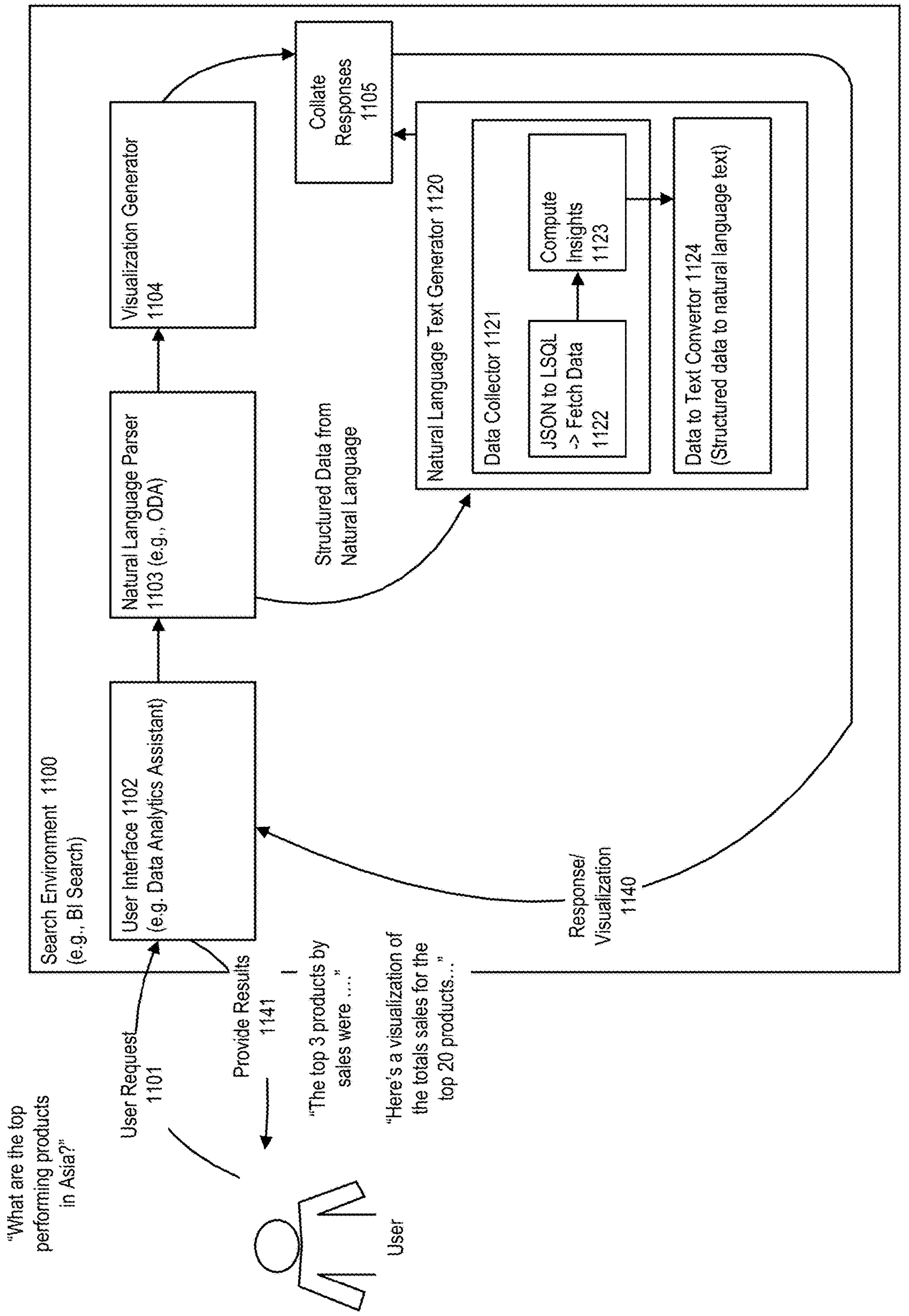
FIG. 12 illustrates the use of a natural language generator service that supports digital assistant integration with a data analytics environment, in accordance with an embodiment.
Figure 13:
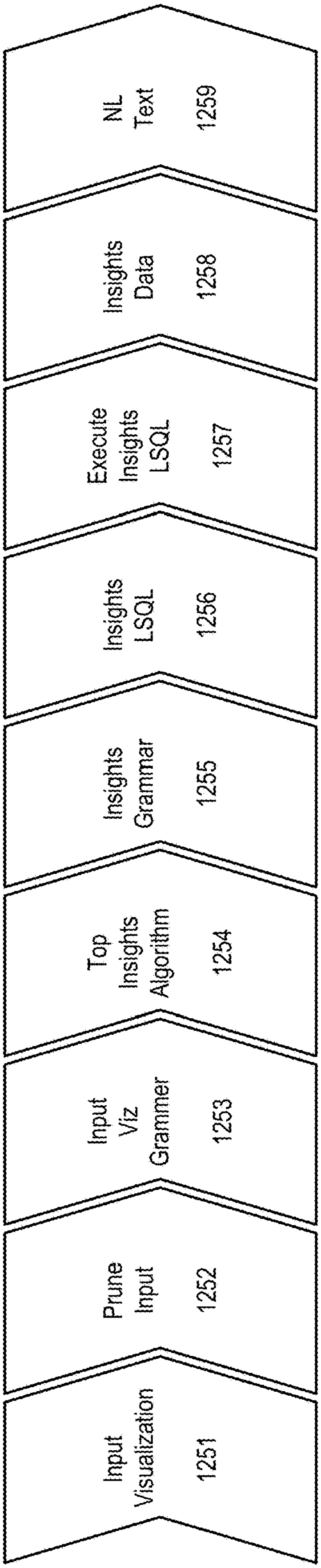
FIG. 13 further illustrates the use of a natural language generator service that supports digital assistant integration with a data analytics environment, in accordance with an embodiment.

FIGS. 12-13 illustrates the use of a natural language generator service to support digital assistant integration, in accordance with an embodiment.

In accordance with an embodiment, as shown in FIG. 12, a user may interact with a user interface 1102 of a search environment 1100 (e.g., BI Search) via a natural language utterance/input (through the specification, such an input can be referred to as a "natural language input"), such as "What are the top performing products in Asian?" This user interface 1102 can comprise, for example, a data analytics assistant or a workbook assistant.

In accordance with an embodiment, this natural language input can be passed to a natural language parser 1103 (e.g., ODA). The natural language input can be parsed by the NL parser for use by both a visualization generator 1104 as well as a natural language text generator 1120. The data passed from the NL parser can comprise, for example, structure data from the natural language input, such as structured JavaScript Object Notation (JSON) from the natural language input or structured SQL from the natural language input.

In accordance with an embodiment, the visualization generator can be utilized to generate one or more data visualizations from data sets and/or columns of data associated with the natural language input (as determined by the NL parser).

In accordance with an embodiment the natural language text generator 1120 can be passed similar structured data from the NL parser, primarily in the form of metadata.

In accordance with an embodiment, the NL text generator can comprise two primary components, the data collector 1121 and the data to text converter 1124.

In accordance with an embodiment, as used with the overall workbook assistant feature, the NLG service primarily comprises various components, as further described below.

Data Collector

In accordance with an embodiment, as used with the overall data analytics assistant feature, the NLG service 1120 can include a data collector 1121 responsible for generating/computing the insightful data 1123 for a given visualization 1140. To accomplish this, it takes the visualization metadata as input. The metadata is processed to extract an input grammar for the NLG service. For example, the input grammar is made up of the projections, group by and filter expressions, dimension and measure columns and any other aspects of the visualization that can be of potential use in generating insights data.

In accordance with an embodiment, the input grammar is pruned using the dataset profile to generate insights grammar. The process of pruning applies transforms to generate insights grammar. For example, a transformation can be to determine a dimension column either from the input grammar or the dataset to explain the measure in the input visualization. Based on this, a rank filter predicate can be added to the grammar. This is just one example of the transformation that aids in fetching a top N insights.

In accordance with an embodiment, the final step is to convert the insights grammar into a Logical SQL (LSQL) instruction that can be executed to fetch insights data 1122.

Data to Text Generator

In accordance with an embodiment, the data to text converter module 1124 is responsible for generating natural language text using the structured data produced by data collector module 1121. The text can be generated in several ways. One approach is to use Language Models or NL Text generation tools such as Yseop. Another approach is to predefine a set of text templates and determine the best template to fit the insights data. Irrespective of the approach used, the outcome is NL Text that describes the Insights data. Using Language Models or Yseop does yield natural and less robotic text.

Insights Algorithm

In accordance with an embodiment, an algorithm for generating insights can be designed in several ways. For example, here a Top N Insights algorithm is described. In accordance with various embodiments, the system can utilize other/multiple algorithms to generate a set of NLG Text. Either all of them can be made available to the end user, or, alternatively, the systems can automatically determine one or more best/better Text for the use case and just display that.

Top N Insights Algorithm

In accordance with an embodiment, the systems and methods can prune input visualization grammar to produce a Top N insights grammar, which then can be converted to text. For instance, the following is one example of template that can be used to generate insights text. Columns from Insights Grammar and the data behind the grammar is plugged into the template for generating the final text.

The top N <rank_dimension> with highest <measure> by <dimension1> <dimension2> < . . . > <filter_list> are rank_dim_value1: [dimension1_value, dimension2_value, . . . measure_value], . . .

In accordance with an embodiment, some considerations while implementing Top N Insights algorithm are:

The number of data points produced by the Insights SQL query issued for the insights should be small enough that it can be expressed in a small body of text. For instance, a number of data points is <=5. This can be achieved by adding relevant filters on appropriate columns (largely driven by cardinality) and injecting column into Group By where appropriate.

When it's not possible to generate <=5 data points, the NL Text template can be modified to generate Top X and Bottom Y insights text.

The Dataset Profile can be leveraged to arrive at the Insights grammar starting from the Input Grammar. Note that the data behind the input visualization is not required to generate the insights. Generated Insights Grammar and the data it generates is related to input visualization but provides more insights than what is available in the visualization.

The table below gives some examples of various input text and the corresponding insights text generated by NLG Service.

TABLE 1

| SI No | Input Text | Insights Text |
|---|---|---|
| 1 | Show me Sales by Customer Name | The top 4 Years (Order Date) with highest Sales by Customer Name are 2016[Allison Kirby: 31285.36], 2014[Clara Hauser: 28158.73], 2015[Anthony Goodwin: 23640.66], 2013[Erin Ballard: 20586.71] |
| 2 | Show me Sales by Product Category in Austin | The top 3 City values with highest Sales by Product Category are Hong Kong [Furniture: 132319.26], Riyadh[Technology: 82992.50], Vancouver[Technology: 81020.03]. The bottom 2 are Essen [Technology: 4701.19], Cologne [Technology: 3035.74] |
| 3 | Show me top 3 Customer Name by Sales | The bottom 5 Customer Name values with lowest Sales are Claire Warren [11.24], Julian Richards[11.19], Ruby Booth[11.13], Tom McFarland[11.07], Ronnie Nolan[11.00] |

Other Insights

In accordance with an embodiment, the insights algorithm can be designed in different ways. For instance, the systems and methods can utilize dataset statistics to explain a dimension or measure in the visualization. Similarly, data behind the input visualization can be utilized to generate insights text. In accordance with various embodiments, along with Top N insights text, various other useful insights text can be generated.

In accordance with various embodiments, examples of user interactions (e.g., user requests 1101 interacting with a user interface 1102) to a search environment 1100 include: Creating a visualization (viz) (e.g., via the visualization generator 1104), for example "Show me sales by region"; or altering the appearance of the canvas, for example "Make the background red". The NL Parser 1103 (e.g., ODA) environment operates using skills which are functional units focused on specific types of task. The OAC environment can be associated with various skills: for example a Conversation to SQL (C2SQL) or C2SQL_Skill will have a C2SQL model used for the 'create viz' interactions, which relates NL input to the columns in a dataset; while a Canvas_Intents_Skill will have intents used for canvas actions, which indicate what the user wants to do (e.g. set the background color) and quantities or qualities (e.g., red).

In accordance with an embodiment, the OAC environment can manage its own skills at runtime. Skills developed can be installed in, for example, a BI_HOME folder alongside an OAC application code, rather than being deployed to the ODA Skill Store. One or more ODA Service Instance APIs allow the OAC application to deploy the skills to ODA. This approach allows automated testing of candidate changes to skills; and tenant on-boarding where new tenant provisioning is largely delegated to runtime application components.

In accordance with an embodiment, a search component, e.g., BISearch talks to a digital assistant environment, e.g., ODA via e.g., an ODA channel, for purposes of processing e.g., an Ask query. The ODA channel routes the Ask query to a configured data analytics system or environment, e.g., OAC, as a skill. The skill performs NLP analysis and return the parsed JSON. The ODA parsed JSON is returned to the search component, e.g., BISearch.

In accordance with an embodiment, responses from both the visualization generator 1104 as well as the NLG service 1120 can be collated 1105 in order to provide a response/visualization 1140 to the user interface 1102, where it can be displayed or provided 1141 to the user. E.g., along with a data visualization, natural language text can be provided, such as "the top 3 products by sale in Asia were . . . " Or "Here's a visualization of the total sales for the top 20 products in Asian . . . ".

FIG. 13 illustrates the use of a natural language generator service to support digital assistant integration, in accordance with an embodiment.

In accordance with an embodiment, more specifically, FIG. 13 shows a flowchart for an input visualization to an insights text. That is, an NLG service can implement a generic utility that can transform input visualization into related insights text. FIG. 13 illustrates a sequence of steps performed to generate Top N insights. Input and Algorithm used can be adjusted to generate different types of Insights text.

In accordance with an embodiment, at 1251, an input visualization can be utilized within the flow. At 1252, the input visualization can be pruned (e.g., pruning metadata). The input grammar for the visualization can be pruned using the dataset profile to generate input visualization grammar 1253.

In accordance with an embodiment, a top insights algorithm 1254 can be applied to this input visualization grammar in order to generate an insights grammar 1255.

In accordance with an embodiment, a query, such as insights LSQL 1256 can be applied to the insights grammar and executed at 1257 in order to generate insights data 1258. A natural language text 1259 can then be generated based upon the insights data.

Figure 14:
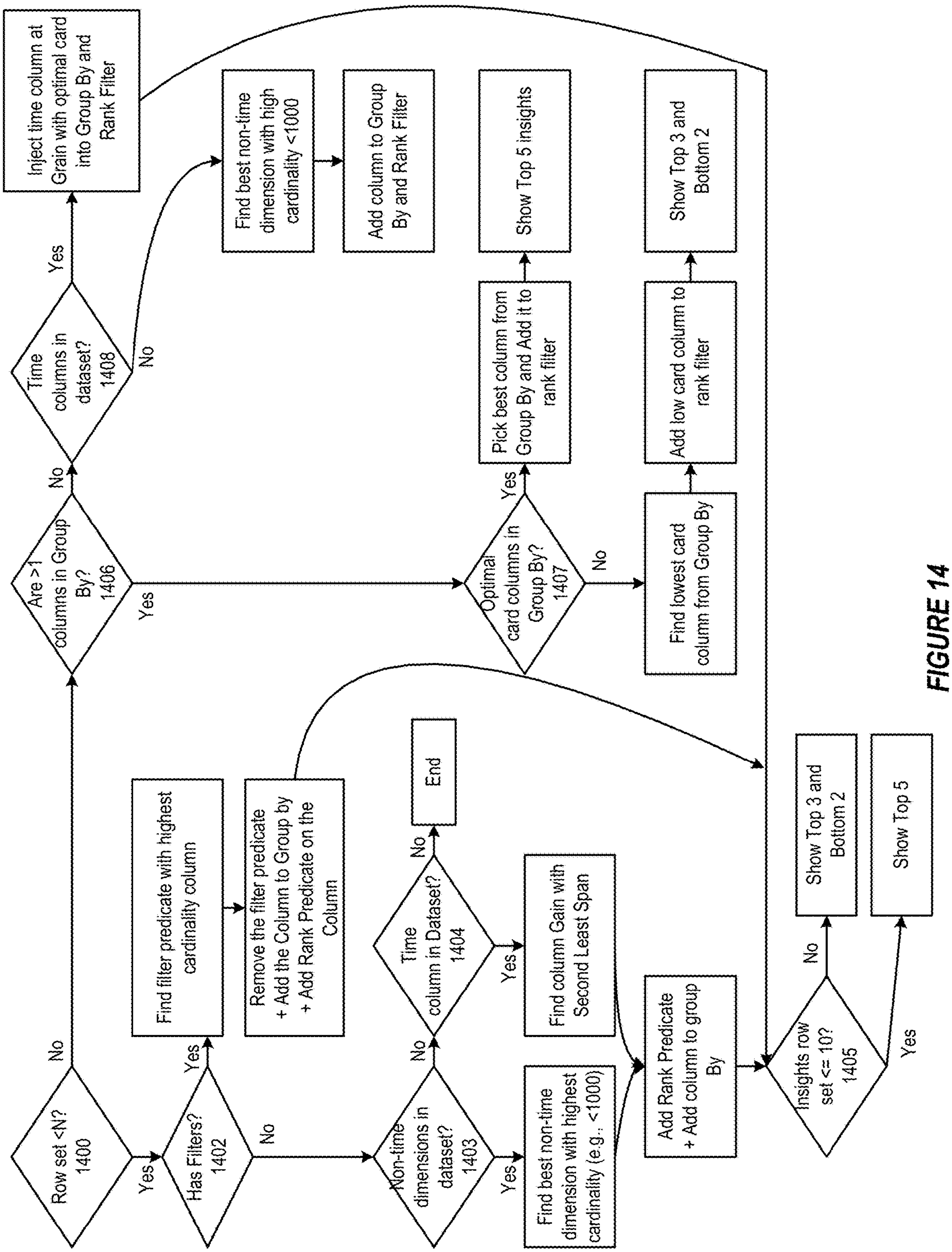
FIG. 14 illustrates a flowchart for a top insights (e.g., top N insights) method or algorithm, in accordance with an embodiment.

FIG. 14 illustrates a flowchart for a top insights (e.g., top N insights) method or algorithm, in accordance with an embodiment.

In accordance with an embodiment, a top insights method can begin with receiving an input visualization grammar and checking 1400 to whether the input grammar comprises a row set less than a certain number of rows, such as 5.

In accordance with an embodiment, if the row set comprises a number of rows less than N, the top insights method can then check 1402 to see whether there are filters. If there are filters, then the top insights method can find the filter predicate with the highest cardinality column, remove the filter predicate, add the column to Group by and add a Rank Predicate on the column. The top insights method can then check 1405 to see whether the insights row set is less than or equal to a certain number of rows, such as 10. If not, a display can be produced with the top 3 and the bottom 2 insights. If yes, a display can be produced with the top 5 insights.

In accordance with an embodiment, if there are no filters, then the top insights method can check to see if there are any non-time dimensions in the data set. If not, the top insights method can check to see if there is a time column in the data set, and if not, the method can end.

In accordance with an embodiment, the top insights method, upon finding that there is a time column in the dataset can find a column gain with a second least span, add a rank predicate and a column to Group by. The top insights method can then check 1405 to see whether the insights row set is less than or equal to a certain number of rows, such as 10. If not, a display can be produced with the top 3 and the bottom 2 insights. If yes, a display can be produced with the top 5 insights.

In accordance with an embodiment, the top insights method, upon finding that there is a non-time dimension in the dataset, can find a best non time dimension with a highest cardinality (e.g., <1000). The top insights method can then add a rank predicate and a column to Group by. The top insights method can then check 1405 to see whether the insights row set is less than or equal to a certain number of rows, such as 10. If not, a display can be produced with the top 3 and the bottom 2 rows. If yes, a display can be produced with the top 5 rows.

In accordance with an embodiment, if the row set comprises a number of rows greater than N (at check 1400), the top insights method can then check 1406 whether there is more than 1 column in the Group By. Upon finding more than 1 column in Group By, the top insights method can check 1407 to determine whether there is an optimal card column in Group By. If there is, the top insights method can pick a best column from Group By and add it to rank filter, and then show the top 5 insights.

In accordance with an embodiment, upon finding more than 1 column in Group By (at check 1406), the top insights method can check 1407 to determine whether there is an optimal card column in Group By. If there is not, the top insights method can find a lowest card column from Group By, add a low card column to the rank filter, and then show the top 3 and the bottom 2 insights.

In accordance with an embodiment, upon not finding more than 1 column in Group By (at 1406), the top insights method can check 1408 to determine whether there are one or more time columns in the dataset. If yes, the top insights method can inject a time column at Grain with an optimal card into Group By and Rank Filter. The top insights method can then check 1405 to see whether the insights row set is less than or equal to a certain number of rows, such as 10. If not, a display can be produced with the top 3 and the bottom 2 rows. If yes, a display can be produced with the top 5 rows.

In accordance with an embodiment, upon not finding more than 1 column in Group By, the top insights method can check 1408 to determine whether there are one or more time columns in the dataset. If no, the top insights method can find a best non-time dimension with high cardinality (e.g., <1000), and add a column to the Group By and Rank Filter. The top insights method can then check 1405 to see whether the insights row set is less than or equal to a certain number of rows, such as 10. If not, a display can be produced with the top 3 and the bottom 2 rows. If yes, a display can be produced with the top 5 rows.

Figure 15A:
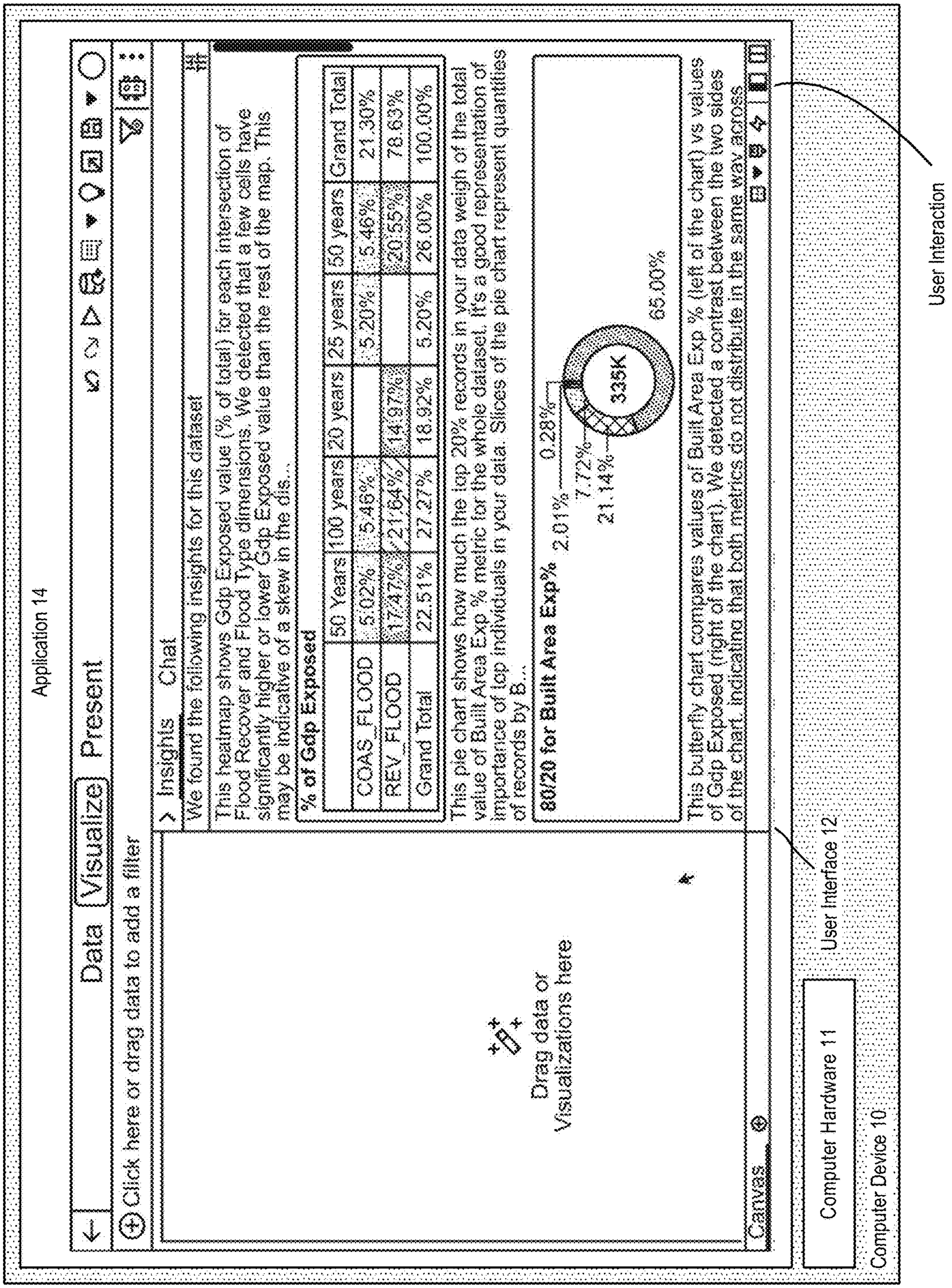
FIG. 15A illustrates the use of a natural language generator service to support user interaction with a data analytics environment, in accordance with an embodiment.
Figure 15B:
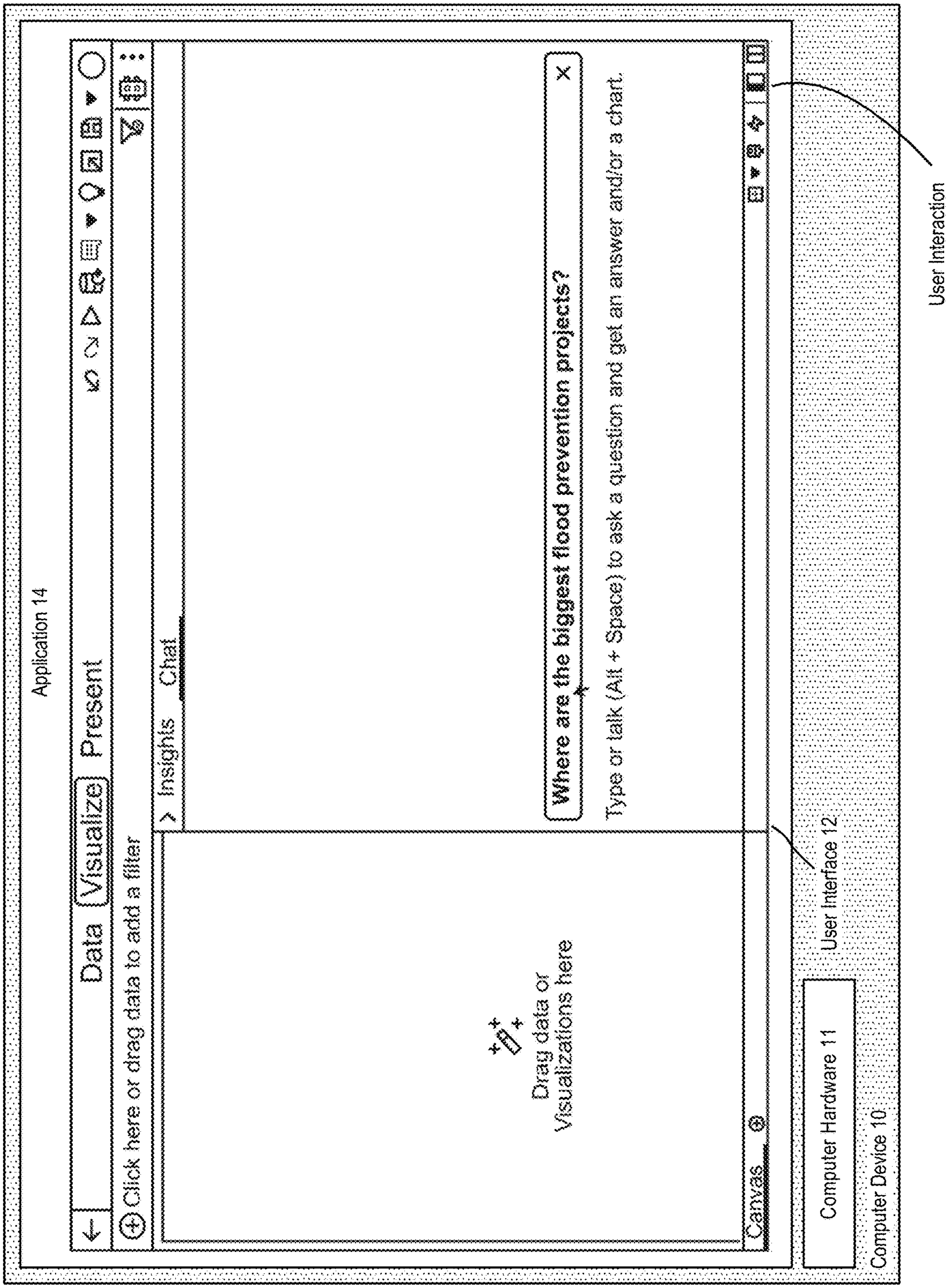
FIG. 15B further illustrates the use of a natural language generator service to support user interaction with a data analytics environment, in accordance with an embodiment.
Figure 15C:
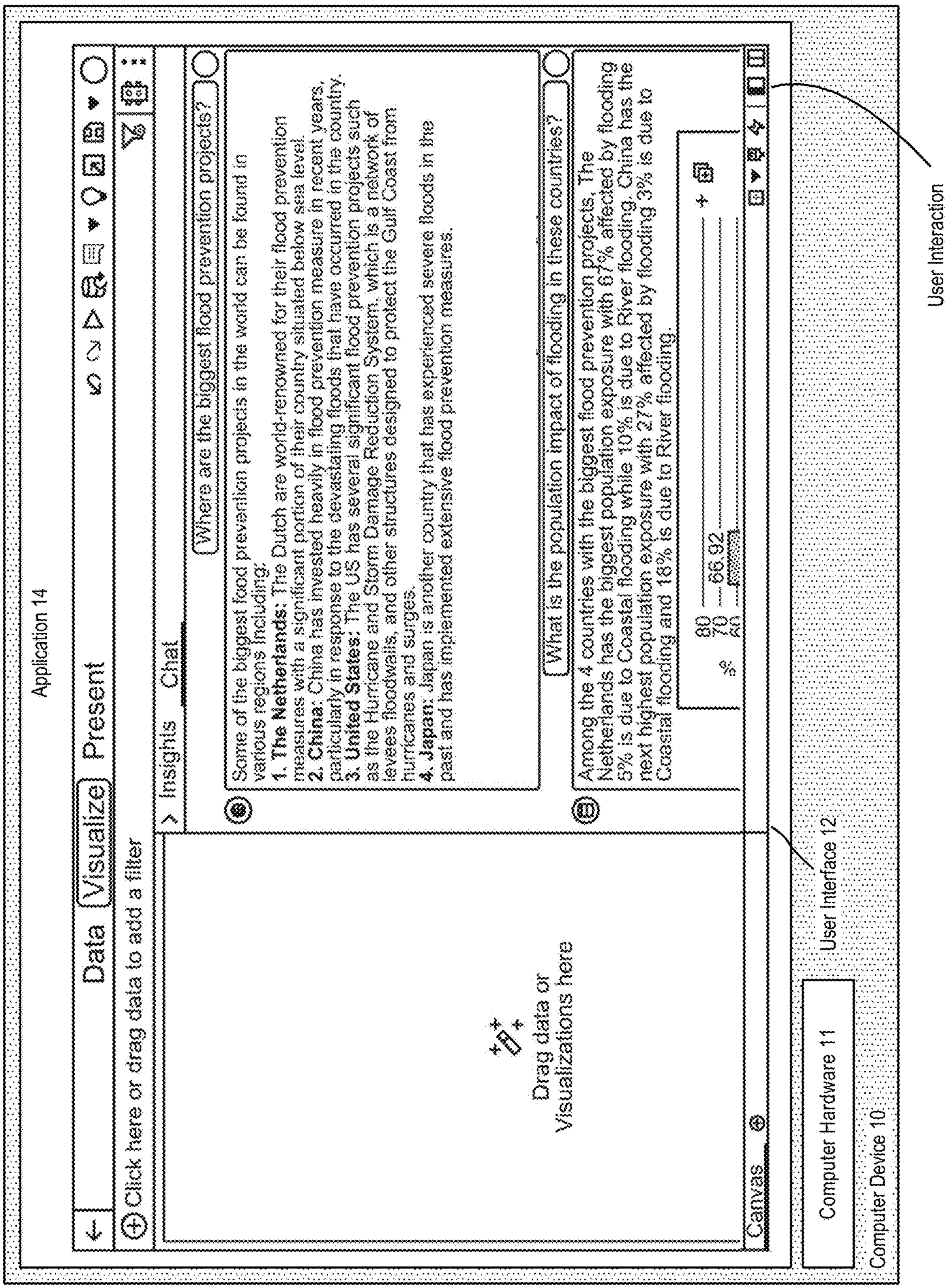
FIG. 15C further illustrates the use of a natural language generator service to support user interaction with a data analytics environment, in accordance with an embodiment.

FIGS. 15A-15C illustrate the use of a natural language generator service to support user interaction with a data analytics environment, in accordance with an embodiment.

Figure 16:
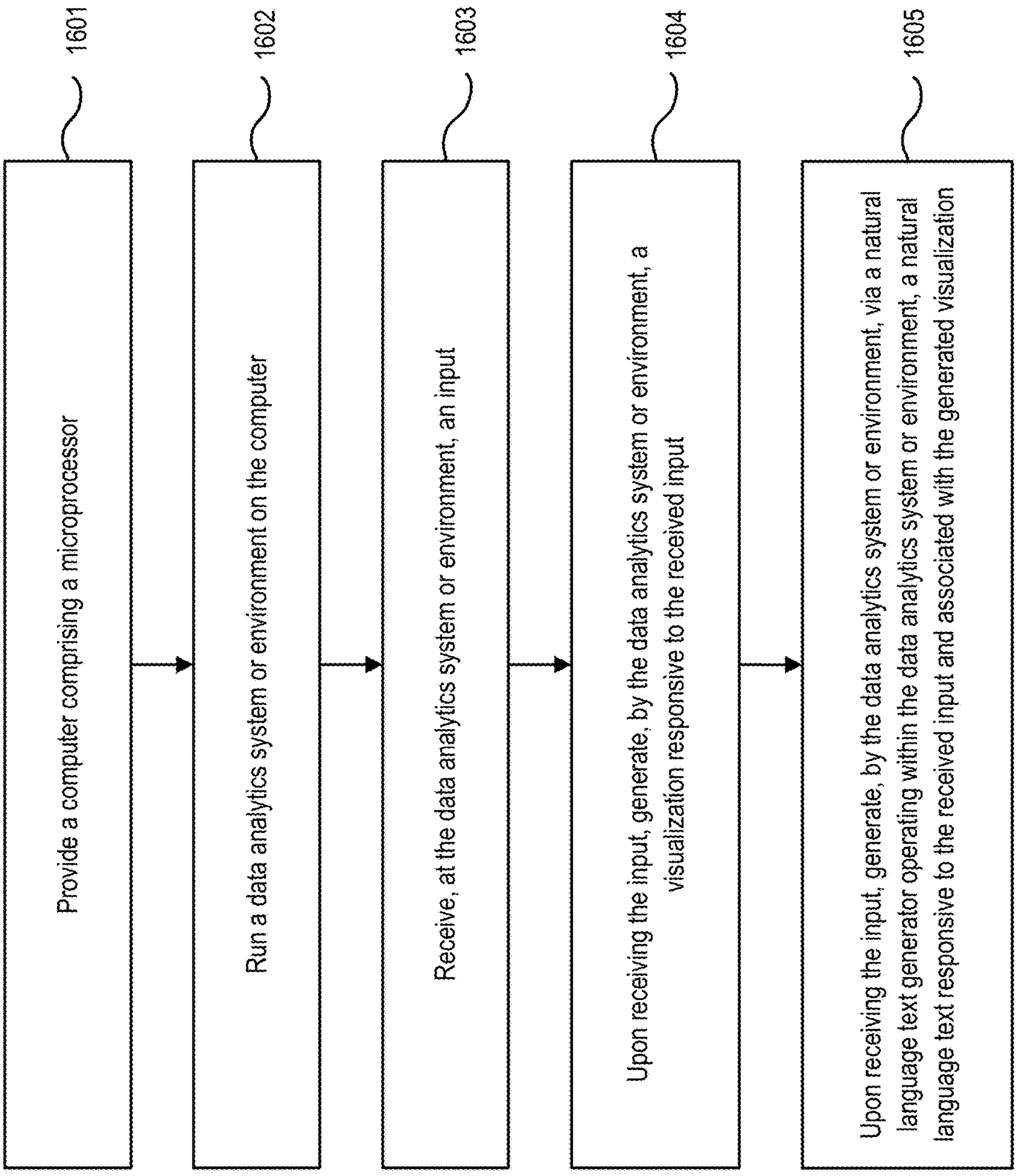
FIG. 16 is a flowchart of a method for providing a natural language generator service for use with data analytics environments, in accordance with an embodiment.

FIG. 16 is a flowchart of a method for providing a natural language generator service for use with data analytics environments, in accordance with an embodiment.

In accordance with an embodiment, at step 1601, the method can provide a computer comprising a microprocessor.

In accordance with an embodiment, at step 1602, the method can run a data analytics system or environment on the computer.

In accordance with an embodiment, at step 1603, the method can receive, at the data analytics system or environment, an input.

In accordance with an embodiment, at step 1604, the method can, upon receiving the input, generate, by the data analytics system or environment, a visualization responsive to the received input.

In accordance with an embodiment, at step 1605, the method can, upon receiving the input, generate, by the data analytics system or environment, via a natural language text generator operating within the data analytics system or environment, a natural language text responsive to the received input and associated with the generated visualization.

In accordance with various embodiments, the teachings herein can be implemented using one or more computer, computing device, machine, or microprocessor, including one or more processors, memory and/or computer readable storage media programmed according to the teachings herein. Appropriate software coding can readily be prepared by skilled programmers based on the teachings of the present disclosure, as will be apparent to those skilled in the software art.

In some embodiments, the teachings herein can include a computer program product which is a non-transitory computer readable storage medium (media) having instructions stored thereon/in which can be used to program a computer to perform any of the processes of the present teachings. Examples of such storage mediums can include, but are not limited to, hard disk drives, hard disks, hard drives, fixed disks, ROMs, RAMs, EPROMs, EEPROMs, DRAMs, VRAMs, flash memory devices, or other types of storage media or devices suitable for non-transitory storage of instructions and/or data.

The foregoing description has been provided for the purposes of illustration and description. It is not intended to be exhaustive or to limit the scope of protection to the precise forms disclosed. Further modifications and variations will be apparent to the practitioner skilled in the art.

The embodiments were chosen and described in order to best explain the principles of the teachings herein and their practical application, thereby enabling others skilled in the art to understand the various embodiments and with various modifications that are suited to the particular use contemplated. It is intended that the scope be defined by the following claims and their equivalents.

What is claimed is:

1. A system for providing a natural language generator service for use with data analytics environments, comprising:

- a computer comprising a microprocessor;
- a data analytics system or environment running on the computer;
- a natural language text generator, comprising:
  - a data collector, operable to receive visualization metadata as input and process the visualization metadata to extract an input grammar for use by the natural language generator service; and a data to text convertor, operable to generate a natural language text using structured data produced by the data collector module;

wherein the data analytics system or environment operates to receive an input directed to analysis of a dataset;

wherein, upon receiving the input, the data analytics system or environment operates to generate a data visualization associated with the dataset and responsive to the received input, wherein the data visualization is associated with a visualization metadata; and wherein the data analytics system or environment, via the natural language text generator operating within the data analytics system or environment, operates to generate a natural language text responsive to the received input and associated with the generated data visualization, including:

pruning the input grammar associated with the data visualization using a dataset profile to generate an insights grammar associated with the dataset; and using the insights grammar associated with the dataset to prepare one or more instructions that are executed to fetch an insights data associated with the dataset, based upon which insights data the natural language text is then generated.

2. The system of claim 1, wherein the natural language text generator comprises a data collector module and a data to text converter module.

3. The system of claim 1, wherein the data collector module receives, from a natural language parser of the data analytics system or environment, a structured data.

4. The system of claim 3, wherein the data collector module prunes the received structured data; and wherein the data collector module applies an insights method to the pruned structured data in order to compute one or more insights in a format of the structured data.

5. The system of claim 4, wherein the data to text converter converts the computed one or more insights in the structured data format to a natural language format.

6. The system of claim 5, wherein the generated visualization and the one or more insights in the natural language format are collated at the data analytics system or environment.

7. The system of claim 6, wherein the collated generated visualization and the one or more insights in the natural language format are provided to a graphical user interface for display, the display comprising both the generated visualization and the one or more insights in the natural language format.

8. A method for providing a natural language generator service for use with data analytics environments, comprising:

providing a computer comprising a microprocessor;

running a data analytics system or environment on the computer;

providing natural language text generator, comprising:

a data collector, operable to receive visualization metadata as input and process the visualization metadata to extract an input grammar for use by the natural language generator service; and a data to text convertor, operable to generate a natural language text using structured data produced by the data collector module;

receiving, at the data analytics system or environment, an input directed to analysis of a dataset;

upon receiving the input, generating, by the data analytics system or environment, a data visualization associated with the dataset and responsive to the received input, wherein the data visualization is associated with a visualization metadata; and generating, by the data analytics system or environment, via the natural language text generator operating within the data analytics system or environment, a natural language text responsive to the received input and associated with the generated data visualization, including:

pruning the input grammar associated with the data visualization using a dataset profile to generate an insights grammar associated with the dataset; and using the insights grammar associated with the dataset to prepare one or more instructions that are executed to fetch an insights data associated with the dataset, based upon which insights data the natural language text is then generated.

9. The method of claim 8, wherein the natural language text generator comprises a data collector module and a data to text converter module.

10. The method of claim 9, further comprising:

receiving, by the data collector module, from a natural language parser of the data analytics system or environment, a structured data.

11. The method of claim 10, further comprising:

pruning, by the data collector module, the received structured data; and applying, by the data collector module, an insights method to the pruned structured data in order to compute one or more insights in a format of the structured data.

12. The method of claim 11, further comprising:

converting, by the data to text converter, the computed one or more insights in the structured data format to a natural language format.

13. The method of claim 12, further comprising:

collating the generated visualization and the one or more insights in the natural language format at the data analytics system or environment.

14. The method of claim 13, further comprising:

providing the collated generated visualization and the one or more insights in the natural language format to a graphical user interface for display, the display comprising both the generated visualization and the one or more insights in the natural language format.

15. A non-transitory computer readable storage medium, including instructions stored thereon which when read and executed by one or more computers cause the one or more computers to perform a method comprising:

running a data analytics system or environment on the one or more computers;

providing natural language text generator, comprising:

a data collector, operable to receive visualization metadata as input and process the visualization metadata to extract an input grammar for use by the natural language generator service; and a data to text convertor, operable to generate a natural language text using structured data produced by the data collector module;

receiving, at the data analytics system or environment, an input directed to analysis of a dataset;

upon receiving the input, generating, by the data analytics system or environment, a data visualization associated with the dataset and responsive to the received input, wherein the data visualization is associated with a visualization metadata; and generating, by the data analytics system or environment, via the natural language text generator operating within the data analytics system or environment, a natural language text responsive to the received input and associated with the generated data visualization, including:

pruning the input grammar associated with the data visualization using a dataset profile to generate an insights grammar associated with the dataset; and using the insights grammar associated with the dataset to prepare one or more instructions that are executed to fetch an insights data associated with the dataset, based upon which insights data the natural language text is then generated.

16. The non-transitory computer readable storage medium of claim 15, wherein the natural language text generator comprises a data collector module and a data to text converter module.

17. The non-transitory computer readable storage medium of claim 16, the method further comprising:

receiving, by the data collector module, from a natural language parser of the data analytics system or environment, a structured data.

18. The non-transitory computer readable storage medium of claim 17, the method further comprising:

pruning, by the data collector module, the received structured data; and applying, by the data collector module, an insights method to the pruned structured data in order to compute one or more insights in a format of the structured data.

19. The non-transitory computer readable storage medium of claim 18, the method further comprising:

converting, by the data to text converter, the computed one or more insights in the structured data format to a natural language format.

20. The non-transitory computer readable storage medium of claim 19, the method further comprising:

collating the generated visualization and the and the one or more insights in the natural language format at the data analytics system or environment; and providing the collated generated visualization and the one or more insights in the natural language format to a graphical user interface for display, the display comprising both the generated visualization and the one or more insights in the natural language format.

* * * * *